United States Patent
McCormack et al.

(10) Patent No.: US 11,297,164 B2
(45) Date of Patent: Apr. 5, 2022

(54) DEVICE AND CONTENT AGNOSTIC, INTERACTIVE, COLLABORATIVE, SYNCHRONIZED MIXED REALITY SYSTEM AND METHOD

(71) Applicant: EolianVR, Inc., Nutley, NJ (US)

(72) Inventors: Michael McCormack, Nutley, NJ (US); Rodney Jackson, Miami, FL (US); Kyle Siptroth, Ellicott City, MD (US); John Cannizzaro, Cedar Grove, NJ (US); Michael Simmons, Cornelius, NC (US); Garrett Krick, Sinking Spring, PA (US)

(73) Assignee: Eolian VR, Inc., Clearwater, FL (US)

(*) Notice: Subject to any disclaimer, the term of this patent is extended or adjusted under 35 U.S.C. 154(b) by 0 days.

(21) Appl. No.: 16/404,942

(22) Filed: May 7, 2019

(65) Prior Publication Data
US 2020/0128106 A1   Apr. 23, 2020

Related U.S. Application Data

(60) Provisional application No. 62/667,873, filed on May 7, 2018.

(51) Int. Cl.
*H04L 29/06*   (2006.01)
*G06N 20/20*   (2019.01)
(Continued)

(52) U.S. Cl.
CPC ............. *H04L 67/38* (2013.01); *G06N 20/20* (2019.01); *G06T 19/003* (2013.01); *G09B 9/003* (2013.01); *H04L 67/2809* (2013.01)

(58) Field of Classification Search
CPC ..... H04L 67/38; H04L 67/2809; G06N 20/20; G06T 19/003; G09B 9/003
(Continued)

(56) References Cited

U.S. PATENT DOCUMENTS 6,409,599 B1   6/2002 Sprout et al.
8,751,324 B2   6/2014 Rosenberg et al.
(Continued)

FOREIGN PATENT DOCUMENTS

WO   WO 2017162068 A1 * 9/2012 ..... H04N 21/234309

OTHER PUBLICATIONS

PCT/US 19/31119 International Search Report, dated Nov. 21, 2019.

*Primary Examiner* — Kevin T Bates
*Assistant Examiner* — Chen-Liang Huang
(74) *Attorney, Agent, or Firm* — Ferdinand IP Law Group

(57) ABSTRACT

A method and system provides a device and content agnostic, interactive, collaborative and synchronized virtual world comprising of three dimensional and two dimensional virtual objects defined by data, which can be viewed, customized, built on and interacted with simultaneously by geographically disparate users with different device types, including VR, AR, Tablet, and Computer devices, whereby the content may be ingested from or controlled by data and models from external sources or the system's internal storage. A machine learning component is implemented as a set of software containers. The containerized solution can be deployed as an enterprise service, in a cloud architecture, or as a part of a monolithic deployment that runs natively in any one of the components as part of the larger architecture. Exemplary use cases include: Real Estate property demonstration, property design, landscape design; health care medical image presentation, clinical decision support, training; Military training, planning, observation, and combat decision support.

33 Claims, 36 Drawing Sheets

(51) Int. Cl.
*G06T 19/00* (2011.01)
*G09B 9/00* (2006.01)
*H04L 29/08* (2006.01)
*H04L 67/131* (2022.01)
*H04L 67/562* (2022.01)

(58) Field of Classification Search
USPC .................................................. 709/219
See application file for complete search history.

(56) References Cited

U.S. PATENT DOCUMENTS

| | | |
|---|---|---|
| 9,495,436 B2 | 11/2016 | Nivargi et al. |
| 9,804,756 B2 | 10/2017 | Massoumi et al. |
| 9,875,576 B2 | 1/2018 | Bergman et al. |
| 10,091,297 B1 | 10/2018 | Zhao et al. |
| 10,182,103 B2 | 1/2019 | Koushik et al. |
| 2003/0046689 A1 | 3/2003 | Gaos |
| 2006/0152579 A1 | 7/2006 | Utsugi et al. |
| 2006/0168522 A1* | 7/2006 | Bala ...................... G06Q 10/00 715/712 |
| 2008/0163089 A1* | 7/2008 | Altieri ................... G06Q 30/02 715/764 |
| 2012/0069131 A1 | 3/2012 | Abelow |
| 2012/0242798 A1* | 9/2012 | Mcardle ............. H04N 21/4312 348/46 |
| 2013/0039531 A1 | 2/2013 | Basso |
| 2014/0337816 A1* | 11/2014 | Chiluvuri ................. G06F 8/36 717/107 |
| 2017/0206691 A1 | 7/2017 | Harrisses et al. |
| 2018/0190028 A1 | 7/2018 | Wadley et al. |
| 2018/0293462 A1* | 10/2018 | Ambati .................. G06N 5/022 |
| 2018/0336069 A1 | 11/2018 | Soni |
| 2018/0259448 A1 | 12/2018 | Harries |
| 2018/0374268 A1 | 12/2018 | Niles |
| 2019/0012843 A1 | 1/2019 | Zhou |
| 2019/0025587 A1 | 1/2019 | Osterhout et al. |
| 2019/0026311 A1* | 1/2019 | Ivanov ................ G06F 9/45558 |
| 2019/0051052 A1 | 2/2019 | Corazza et al. |
| 2020/0128348 A1* | 4/2020 | Eronen ................... H04S 7/303 |

* cited by examiner

DEVICE AND CONTENT AGNOSTIC, INTERACTIVE, COLLABORATIVE, SYNCHRONIZED MIXED REALITY SYSTEM AND METHOD

CROSS REFERENCE TO RELATED APPLICATIONS

This application claims priority of U.S. Provisional Patent Application No. 62/667,873, filed on May 7, 2018, entitled Soldier/Squad Virtual Trainer which is hereby incorporated in its entirety.

TECHNICAL FIELD

Embodiments of the subject matter described herein relate generally to computer systems and applications for storing, delivering, configuring, and synchronizing content, whereby different types of content may be ingested from internal or external sources and controlled by a plurality of users, includes live and non-live data, and mathematical models, such as machine learning models, analytics models, and simulation models. The embodiments particularly include a method for automatically synchronizing content comprising an immersive Virtual Reality, Augmented Reality, Phone/Tablet, or PC immersive experience between a content repository (cloud based or on premise) and/or external data providers and one or more associated client applications running on Virtual Reality, Augmented Reality, Phone/Tablet, or PC devices.

BACKGROUND OF THE INVENTION

This section is intended to provide a background and context for the invention disclosed below. The description herein may include concepts that could be pursued but are not necessarily ones that have been previously conceived, implemented, or described by others. Therefore, unless otherwise explicitly indicated herein, what is described in this section is not prior art to the description in this application and is not submitted to be prior art by inclusion in this section.

"Virtual Reality (VR)" may be defined as a computer-generated simulation of a two-dimensional or three-dimensional image or environment that can be interacted with in a seemingly real or physical way by a person using special electronic equipment, such as a helmet with a screen inside, or goggles and hand-held controls or other sensors.

"Augmented Reality (AR)" may be defined as a computer-generated simulation of a two or three-dimensional image or environment that can be superimposed on a user's view of the real world.

A "Tablet/Phone computer" or "Tablet/Phone Device" may be defined as a mobile device, typically with a mobile operating system and touchscreen display, a central processing unit, a network interface, a graphics processing unit, RAM, storage, and a rechargeable battery.

"A Personal Computer (PC)" may be defined as a non-mobile device or laptop, typically with a central processing unit, a network interface, a graphics processing unit, RAM, storage, a power supply, a screen, and input devices.

A "Mixed Reality Device" may be defined as a device capable of stimulating a user's senses whereby the physical world is somehow incorporated into the user experience and "Mixed Reality Content" may be defined as content that is designed to somehow incorporate the user's physical world into the content. AR Devices, VR Devices, Tablet/Phone computers, and Personal Computers are all capable of delivering a Mixed Reality content to users.

"Device Agnostic" may be defined as the ability for a computing system, module, or component to work with various other systems without requiring any special adaptations. A device agnostic system is a system designed to be compatible across most common systems.

"Interactive" may be defined as the capacity for content to be manipulated, such as moved, scaled, modified, re-configured, or altered in any way at run-time or offline.

"Collaborative" may be defined as an experience in which two or more parties are able to interact with the same content in a way that allows each user to see the actions performed by the others as if they were in the same physical space interacting with physical objects.

"Synchronized" may be defined as an experience wherein a set of characteristics, including but not limited to, the location, state, scale, and materials of content being viewed or interacted with by two or more parties and avatars representing users are synchronized among all parties. In the case of location, for example only, the virtual positions of content and user's avatars are synchronized among all parties such that when one user moves themselves to a new position in the virtual environment the avatar representing said user in all party's virtual environments is moved to the new position, and/or when one user moves an object being viewed or interacted with to a new position, the position of said object is simultaneously altered in all other user's virtual environments.

An "Open Systems Architecture (OSA)" approach integrates business and technical practices that yield systems with loosely coupled modules which can be interchanged. A system constructed in this way allows vendor-independent acquisition of modules and capabilities, including the intentional creation of interoperable Enterprise-wide reusable components. Successful OSA acquisitions result in reduced total ownership cost and can be quickly customized, modified, and extended throughout the product life cycle in response to changing user requirements.

"Computer data" or "data" is information processed or stored by a computer. Data may be in the form of text documents, images, audio clips, software programs, binaries, or other formats. Herein, the terms Data and Content are used interchangeably.

A "simulation" refers to a digital representation of some physical or abstract thing T, whereby the simulation takes input data I and applies a plurality of predefined mathematical formula(s) $F_n$, $F_{n+1}$ to generate an outcome that is consistent with how said thing would operate, perform, or act in the real-world. By the definition defined above and used herein, a simulation itself is a type of data (aka content); and the outcome of a simulation is also data (aka content). Thus, when the terms data or content are used herein, they should also be interpreted by the reader to include simulations and their output.

"Machine learning" refers to a computer process that learns from experience E with respect to some class of tasks T and performance measure P, if its performance at tasks in T, as measured by P, improves with experience E.

A "Machine Learning Model (or ML Model)" is an artifact that is created by a Machine Learning training process, which involves providing an ML algorithm (that is, the learning algorithm) with training data to learn from.

A "physical configuration" describes how the actual hardware and software resources needed for a particular system are arranged. In the case of a system that is device agnostic, a physical configuration also reflects the actual hardware that has been implemented during the physical deployment of the system. For example, a physical configuration for a device agnostic application that was implemented for a business would specify the type, brand, and computing power of the end-user devices.

A "configuration file" is a data file F that provides parameters $P_{n, n+1}$ . . . , such as settings, for a computer process Pr, which uses them as method variables while performing methods $Mn_{n, n+1}$ . . . . Configuration files can be used for a wide range of reasons such as to initialize simulations, customize user interfaces, and establish where to access data from within or outside a system.

Based upon our knowledge, information, and beliefs, besides the invention discussed herein there is no single system in the prior art able to provide all of the following capabilities, for which the invention disclosed herein is able to provide.

1. Allow users located in different geographic locations AR, VR, Tablet/Phone, and PC users to view and interact with the same content simultaneously in a collaborative experience.
2. Allow AR, VR, Tablet, and PC users to easily create new content for distribution through the platform using the end-user application or third party software applications.
3. Allow AR, VR, Tablet, and PC users to see virtual avatars of each other inside the virtual environment.
4. Allow for new assets to be imported into the virtual environment at runtime, for shared viewing and/or interaction among AR, VR, Tablet, and PC users, said assets coming from external or internal data providers or from the output of machine learning models.
5. Allow for one user to modify a plurality of other user's environment.
6. Allow for re-playing of the events that occurred in the virtual environment without having to record the entire event using video.
7. Allow for remote observation of other users, including first and third person views, during and after simulations.
8. Allow for any type or format of content (i.e. data) to be viewed.
9. Allow for content to be controlled in real-time by external data.
10. Allow for content to be controlled in real-time by machine learning models.

The invention discussed herein eliminates all of the functional limitations listed above with a novel system and set of methods.

DESCRIPTION OF FIGURES

Embodiments will now be described, by way of example only, with reference to the attached figures, wherein.

SUMMARY

Figure 1:
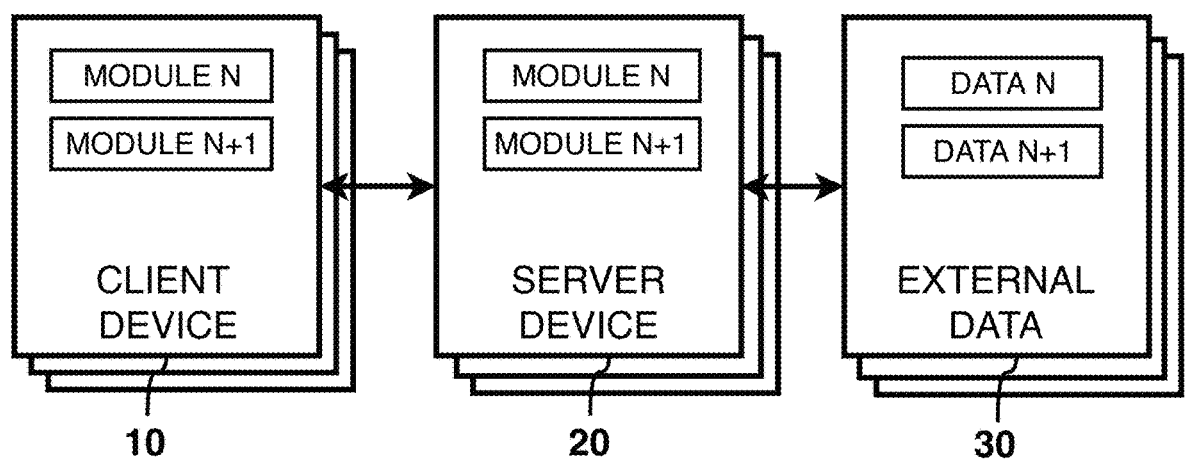
FIG. 1 shows a high level view of the system.

The invention is a system and a method for providing a user with a content agnostic, device agnostic, interactive, collaborative, and synchronized virtual simulation comprising of one or multiple three dimensional objects, which can be viewed, customized, built on, and interacted with simultaneously by users located in different locations, whereby the content may be ingested from external sources and controlled by a plurality of users, live and non-live data, and mathematical models (such as machine learning models, analytics models, and simulation models).

In accordance with an embodiment of the invention, a user is able to access the System using an AR Device, a VR Device, a mobile Tablet/Phone Device, or a Computer Device.

In accordance with an embodiment of the invention, a VR Device User, an AR Device User, a Tablet/Phone Device User, and a Computer Device User are able to access the same system, view the same content, and interact with each other while located in geographically disparate locations.

In accordance with another embodiment of the invention, users may be located in the same geographic location.

In another embodiment, one or multiple groups of users located in the same geographic location can interact with one or multiple other users and/or other groups of users located in different geographic locations.

In another embodiment, each user's first person perspective is unique based on their physical location and orientation, until content is initialized by one user, at which point all users are able to see said content.

In another embodiment, the users are able to see avatars that represent other user's position relative to the content being viewed.

In another embodiment, the content can be added to by placing new content alongside content already initialized, such that all users are able to see the new content.

In another embodiment, the users are able to interchange the content completely, removing all content presently initialized and replacing it with new content, such that all users no longer see the previously initialized content and see the newly initialized content.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not limit the scope of the invention which is defined by the claims.

The elements, construction, apparatus, methods, programs, and algorithms described with reference to the various exemplary embodiments and uses described herein may be employable as appropriate to other uses and embodiments of the invention, some of which are also described herein, others will be apparent when the described and inherent features of the invention are considered.

Introduction

Referring to FIG. 1, it shows a high-level system deployment architecture for a set of one or multiple stand-alone modules that are stored and processed on Client Devices 10 and/or Server Devices 20 that are able to ingest External Data 30 from one or more external sources.

Figure 2:
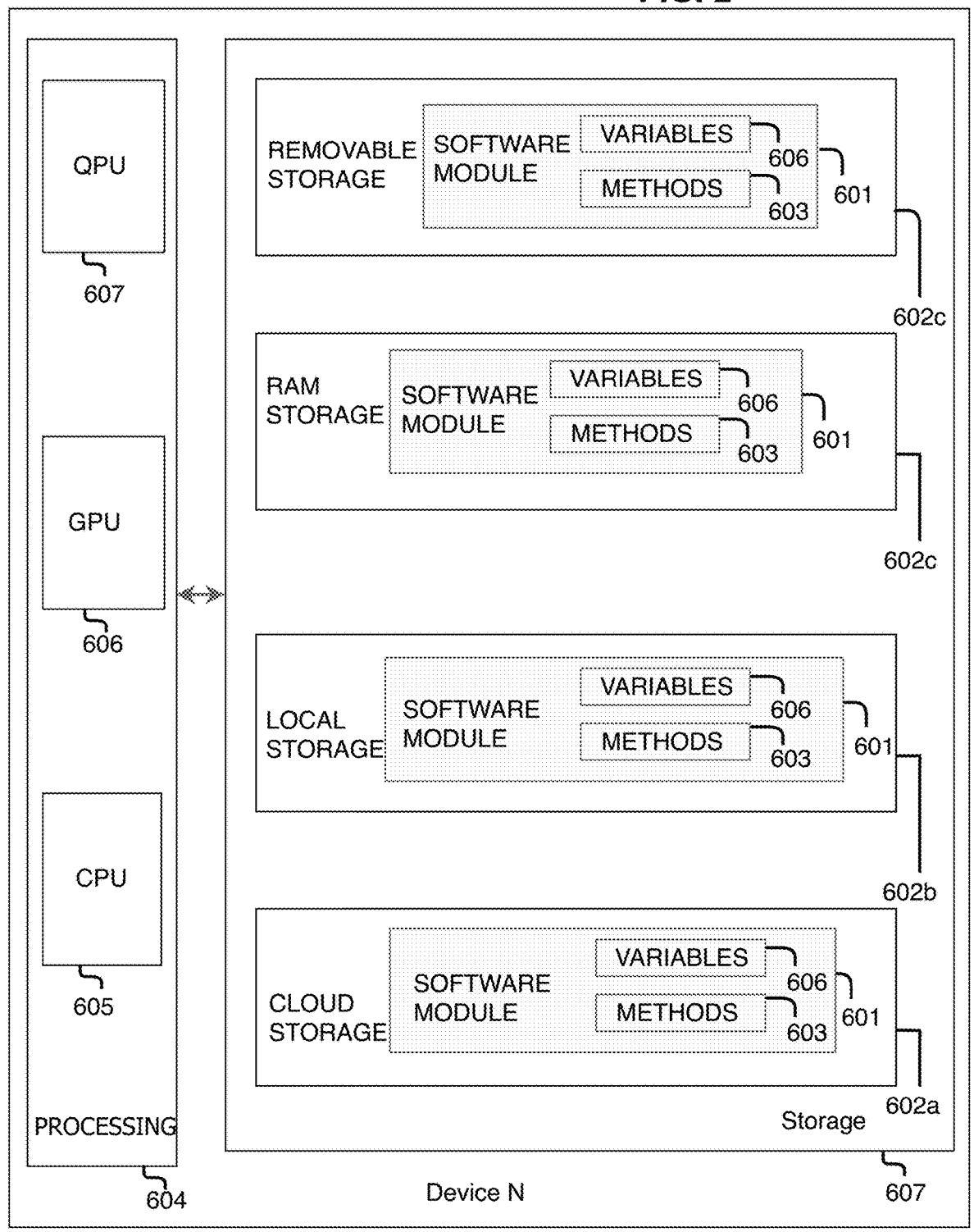
FIG. 2 shows a low level view of the system devices.

Referring to FIG. 2, in accordance with an embodiment of the invention, Client Devices 10 and Server Devices 20 contain a set of Software Modules 601 stored in one or multiple digital storage devices 602 such as Cloud-based Memory 602a, Local Memory 602b, RAM 602c, and/or External Memory 602d. Each of the Client Devices 10 and Server Devices 20 contain a set of Software Methods 603 that are processed by one or multiple Processing Components 604, such as a Central Processing Unit 605 and/or a Graphical Processing Unit 606, and/or a Quantum Computing Processing Unit 607 according to a set of Method Variables 608 that may be set at runtime or prior, stored in and retrieved from one or more of the Storage Devices 602. External Data 30 may also be stored on external servers or peer-to-peer devices so long as they can be accessed by one of the Client Devices 10 or one of the Servers 20 of the architecture.

Figure 3:
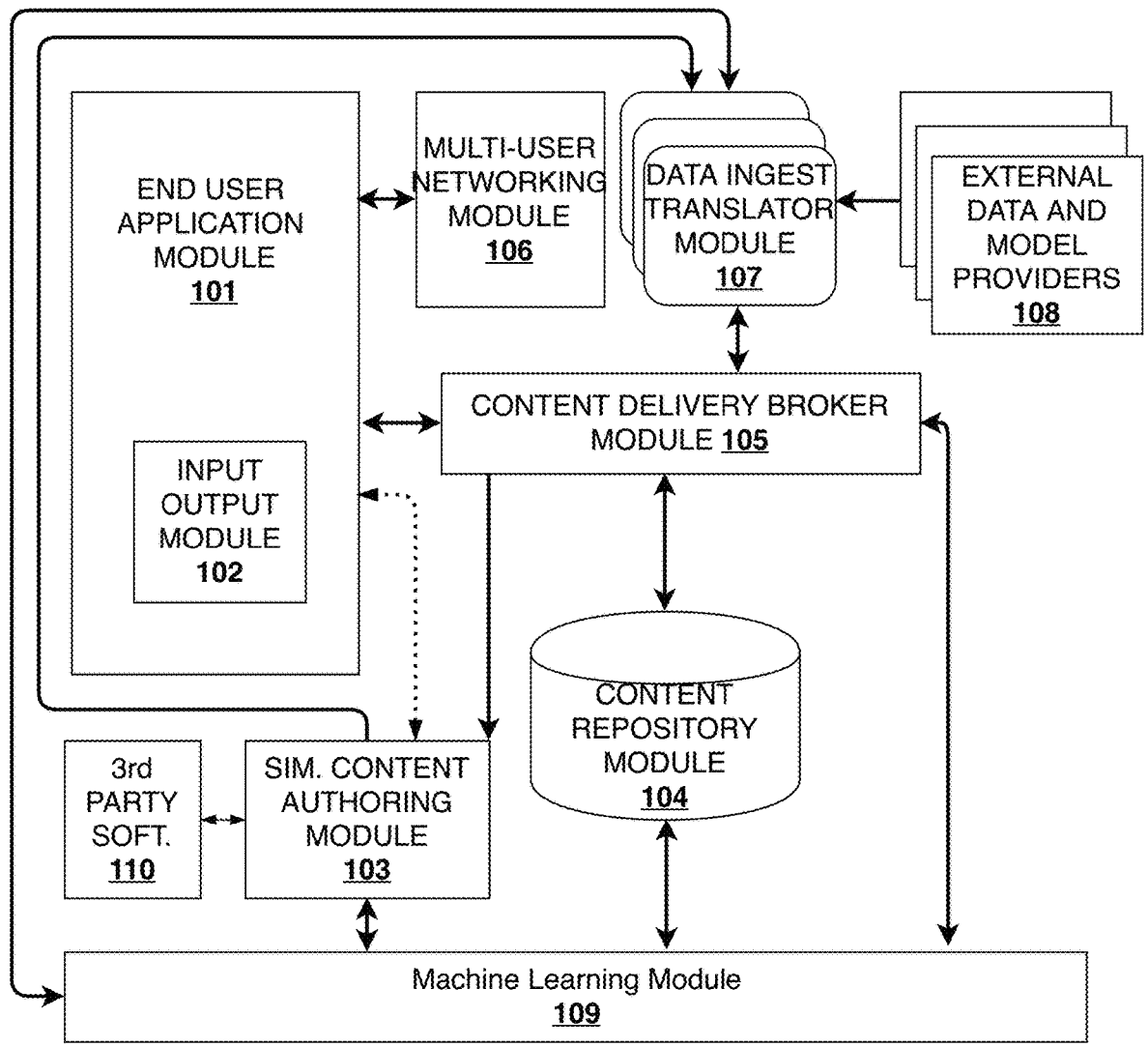
FIG. 3 shows a high level view of the system architecture.

The System 100 of FIG. 3 is based on a modular, secure Open Systems Architecture (OSA), whereby the System 100 is able to operate with or without each component including but not limited to, an End User Software Application Module 101, an Input/Output Module 102, a Simulation Content Authoring Module 103, a Content Repository Module 104, a Content Delivery Broker Module 105, a Multi-user Networking Module 106, a Data Ingest Translators Module 107, one or more External Data providers or Sources 108, a Machine Learning Module 109, and one or more 3rd Party Software Applications 110. Each module may operate to perform its function in combination with other modules or may operate independently of the other modules. Each module may operate on Client Devices 10 or on Server Devices 20 depending on customer requirements or resources that may dictate the system's physical configuration.

For example, an End User could operate the System 100 using only the End-user Application Module 101, the Data Ingest Translators Module 107, and External Data Providers 108, independent of the Content Repository Module 104, the Content Delivery Broker Module 105, the Multi-user Networking Module 106, and the Machine Learning Module 109, whereby, in such a case, the End User could operate the system with full functionality but would be limited to reading data available from external sources or data already available in their local storage. In an alternate scenario, all of the modules are present, and thus the capabilities of each module are available to the end user. Those skilled in the art who follow the teachings set forth in this patent will understand that other uses of some, but not all, the modules shown in FIG. 3 are useful for creating, reading, updating, delivering, and interacting with data.

FIG. 3 shows one End-user Application Module 101. Those skilled in the art understand there may be one or more end user and each end user will have an End-user Application Module 101. The End-user Application Module 101 of FIG. 3 and all other End-user Application Modules are coupled with the Multi-user Networking Module 106, the Content Authoring Module 103, and the Content Delivery Broker Module 105 such that it may exchange data with the Content Delivery Broker Module 105, exchange data with the Content Authoring Module 103, and exchange data with the Multi-user Networking Module 106. All requests for content (data) made by the user through the End-user Application Module 101 go through the Content Delivery Broker Module 105, with the exception of the synchronized variables exchanged between the End-user Application Module 101 and the Multi-user Networking Module 106, see For example, if the end-user requests data from an External Data Source 108, the End-user Application Module 101 will route the request to the Content Delivery Broker 105, which will route the data request to the Data Ingest Translators Module 107, which will fetch the requested data from an External Data Provider 108, then translate the received data into data one or multiple formats compatible with the active end-user devices, and then send the translated data to the Content Delivery Broker 105, which will then disseminate the data to the End-user Application Modules 101 in formats compatible with the different end user devices.

As shown in FIG. 3, in accordance with an embodiment of the invention, the Input/Output Module 102 is coupled to the End-user Application Module 101 such that it may (i) receive inputs from peripheral devices such as sensors and (ii) generate output for peripheral devices such as haptics, speakers, or display devices.

As shown in FIG. 3, in accordance with an embodiment of the System 100, the Simulation Content Authoring Module 103 is integrated with the Data Ingest Translators Module 107, the Machine Learning Module 109, the Content Delivery Broker Module 105, the End-user Application Module 101, and 3rd Party Software Applications 110 such that Simulation Content Authoring Module 103 may (i) exchange data with the Content Delivery Broker Module 105, (ii) exchange data with the Machine Learning Module 109, (iii) exchange data with 3rd Party Software Applications 110, (iii) exchange data with the End-user Application Module 101, and (iv) output data to the Data Ingest Translators Module 107.

The Simulation Authoring Module 103 allows the end user to operate the authoring capabilities of the System 100 using either 3rd Party Software Applications 110 or the End-user Application Module 101. These modules, 110 or 101, are loosely coupled with the Simulator Content Authoring Module 103, which is coupled with the Content Delivery Broker Module 105, which together provide a pipeline for the user to create, read, update, and delete content from a plurality of sources such as External Data Providers 108 through the Data Ingest Translators Module 107 or content from the Content Repository Module 104, because these modules are coupled with the Content Delivery Broker Module 105. For example, during the authoring process, a user creating a training simulation using 110 or 101 is able to read a list of content available in the Content Repository Module 104 and/or content available in External Data Sources 108, which they can then import, change, or use as part of a new Simulation they are creating, such as a vehicle being added to a Military Use of Force Training Simulation. Once the user has finished creating a Simulation, directly from either 3rd Party Software Applications 110 or the End-user Application Module 101, and through these module's interfaces with the Content Delivery Broker Module 105, the user can add the newly created Simulation to the Content Repository Module 104 as a file (or set of files), including a simulation configuration file that dictates the contents and configuration of the simulation, such that afterwards the simulation is then available to other end users who have the privilege to access the simulation based on their credentials through the Content Delivery Broker Module 105.

Referring to FIG. 3, the Content Repository Module 104, which is also referred to herein as the Simulation Content Repository Module 104, is coupled with the Content Delivery Broker Module 105 and the Machine Learning Module 109, such that it may (i) receive input from the Content Delivery Broker Module 105, exchange data with the Machine Learning Module 109, (ii) store content it receives, and (iii) output data to the Content Delivery Broker Module 105 and the Machine Learning Module 109 on demand.

The objects in the Content Repository Module 104 are given unique identifiers. Simulations and/or content may consist of a plurality of objects with a plurality of unique identifiers. When a simulation is presented to multiple users, each end user receives the unique identifiers for the plurality of content comprising the multi-user simulation and the synchronized variables for the simulation, such as the position various objects, via the Multi-user Networking Module 106. Then, each End-user Application Module 101 individually and automatically retrieves the objects from the Content Repository Module 104 via the Content Delivery Broker Module 105 or from External Data Provider 108 via the Data Ingest Translators and the Content Delivery Broker Module 105, and then loads the objects and/or updates the simulation variables, such as the position of objects, according to the synchronized variables. During a simulation one or more users may alter the simulation, such as by making a change to an object, moving an object, adding another object, or removing an object. For example, the alteration may be the addition of new content acquired from External Data Provider 108, which is ingested and stored in the Content Repository Module 104 or may already exist in the Content Repository Module 104. The alteration is given a unique identifier and that identifier is distributed to the other users via the Multi-user Networking Module 106. Upon receipt of a unique identifier, each End-user Application Module 101 is updated and synchronized by reading or otherwise importing from the Content Repository Module 104, via the Content Delivery Broker Module 105, the object or alteration liked to the unique identifier and/or changing the position of the object to match the position provided by the Multi-user Networking Module 106. This method of updating and synchronizing the end user applications reduces the time it would take for one end user to send objects (data) to each of the other end users. Instead, the Content Delivery Broker Module 105 provides quick delivery of the actual object based upon the unique identifier.

As shown in FIG. 3, in accordance with the System 100, the Content Delivery Broker Module 105 is coupled with the End-user Application Module 101, the Content Repository Module 104, the Data Ingest Translators Module 107, a Machine Learning Module 109, and the Simulation Content Authoring Module 103, such that the Content Delivery Broker Module 105 may (i) receive input from the Data Ingest Translators Module 107, exchange data with the Machine Learning Module 109 (ii) receive input from the Content Repository Module 104, (iii) output portions of the data received from the Data Ingest Translators Module 107 to the Content Repository Module 104, (iv) output portions of the data received from the Data Ingest Translators Module 107 to the End User Software Application Module 101, (v) output the data received from the Data Ingest Translators Module 107 and the Content Repository Module 104 and output that data to the Simulation Content Authoring Module 103.

As shown in FIG. 3, the Multi-user Networking Module 106 is coupled with the End-user Application Module 101, such that it may exchange data with each active End-user Application Module 101.

Referring to FIG. 3, in accordance with an embodiment of the invention, a System 100 includes one or more Data Ingest Translators Modules 107 that are coupled to one or more External Data Providers or Sources 108, a Simulation Content Authoring Module 103, a Machine Learning Module 109, and a Content Delivery Broker Module 105. The Data Ingest Translators Module 107 may ingest External Data 108 and data output by the Simulation Content Authoring Module 103 to generate outputs for the Content Delivery Broker Module 105. The Data Ingest Translators Module may exchange data with the Machine Learning Module 109, such as sending data to the Machine Learning Module 109 to train a Machine Learning Model to autonomously identify new relevant external data based on a user's prior interaction with the system.

Those skilled in the art understand that End User Devices and Applications may require the use of different formats to receive, read, render, and transmit data, and data supplied by the External Data Providers 108 and data stored in the Content Repository Module 104 as well as the methods in which data is transported between the Content Delivery Broker Module 105 and the End-user Application Module 101 may differ in the formats that it uses to receive, read, render, and transmit data in order to accommodate devices that require the use of such different formats. The system does this by routing data requests made from the End-user Application Modules 101 into the Content Delivery Broker Module 105, which routes the data request to the Data Ingest Translators Module 107 if the request is for data from an External Data Source 108 or the Content Repository Module 104 if the request is for data already located in the system. If the request is for data from an External Data Source 108, the Data Ingest Translators Module 107 retrieves the data from the external source, then translates the data into a data format compatible with the other End-user Application Module(s) 101 and returns the data to the Content Delivery Broker Module 105, which then sends the data to the End-user Application Module(s) 101 in a format that the end-user device is able to read. In another embodiment, the Content Delivery Broker Module 105 may also store a copy of the translated content in the Simulation Content Repository Module 104 for later use, to eliminate the redundancy of translating the same content multiple times. If the request is for data from the Content Repository Module 104 that has already been previously translated, the Content Delivery Broker Module 105 requests the data from the Content Repository Module 104 and then sends the received data to the End-user Application Module 101.

As shown in FIG. 3, the System 100 employs machine learning to enhance its performance. Machine learning includes statistical models that computer systems use to modify programmed tasks based on prior results or data without relying on specific computer instructions to perform the new tasks. In effect, the modified tasks are the result of the computer having learned how to predict improvements in the existing instructions and implement the improvement by providing new or modified instructions without explicit reprogramming of the underlying program or platform. Machine learning relies on patterns and inferences drawn from analyzing results and/or prior data sets. Machine learning algorithms (computer programs) are constructed with known or novel mathematical models of sample data ("training data") in order to make predictions or decisions without being explicitly programmed to perform the tasks. System 100 uses machine learning algorithms because it is quicker and often infeasible to develop an algorithm for improving the system manually.

Machine learning includes supervised learning, unsupervised learning, and reinforcement learning. During supervised learning a target or outcome variable (or dependent variable) is predicted from a given set of predictors (independent variables). In its simplest form, it generates a function that maps inputs to desired outputs. Examples of supervised learning include Regression, Decision Tree, Random Forest, KNN, Logistic Regression, etc. Unsupervised learning has no target or outcome, but clusters population in different groups for specific intervention. Examples of Unsupervised Learning: Apriori algorithm, K-means. Reinforced learning trains a machine to make specific decisions. The machine is exposed to an environment where it trains itself continually using trial and error. This machine learns from past experience and tries to capture the best possible knowledge to make accurate decisions. The Markov Decision Process is one example of reinforced learning.

Figure 7:
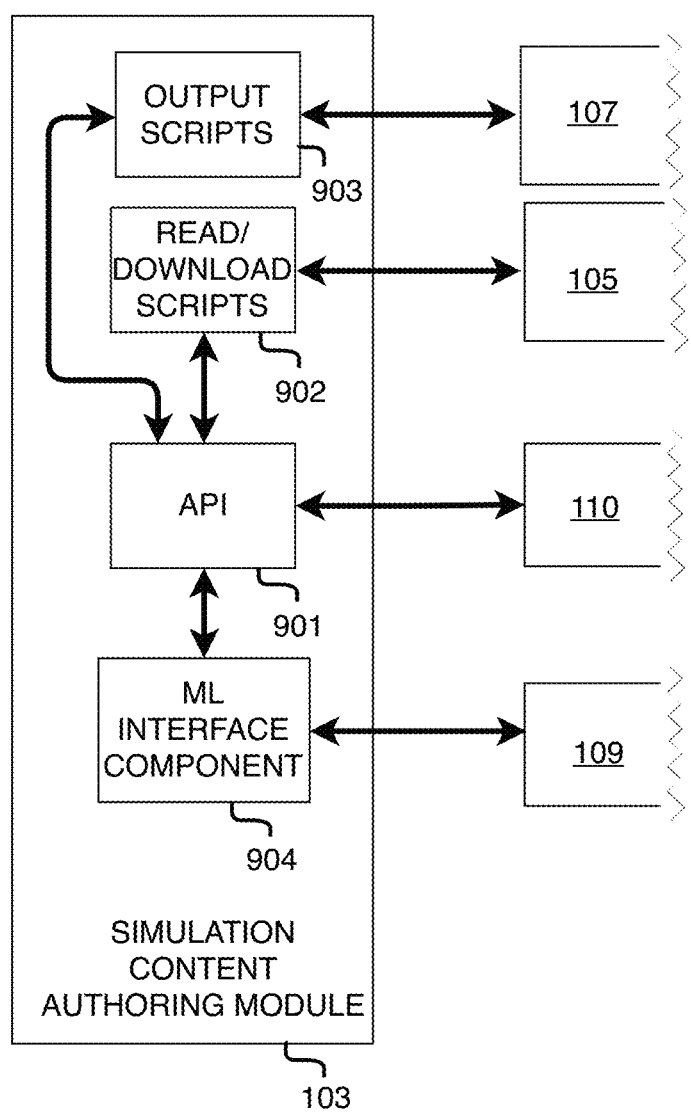
FIG. 7 shows the Simulation Content Authoring Module.
Figure 8:
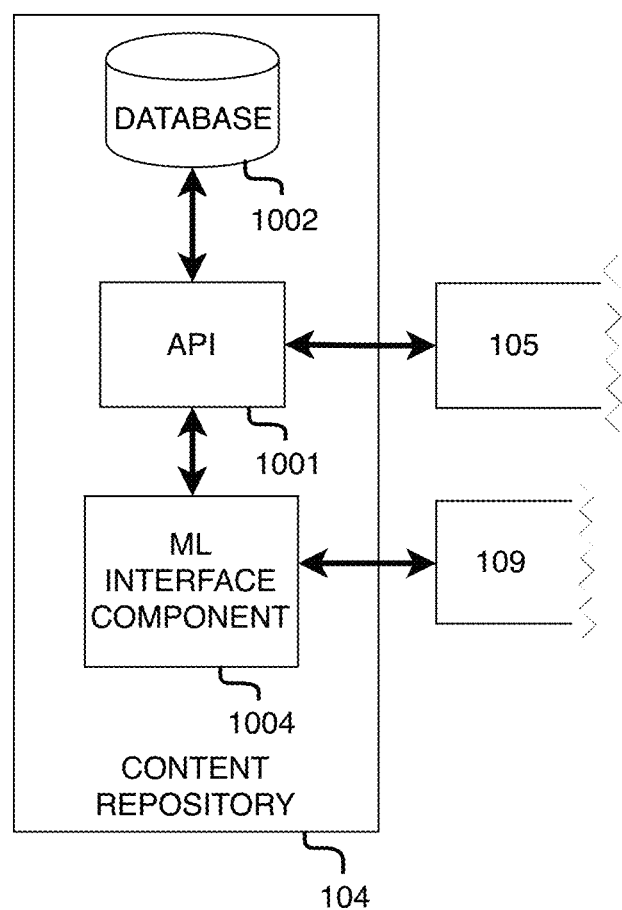
FIG. 8 shows the Content Repository Module.
Figure 9:
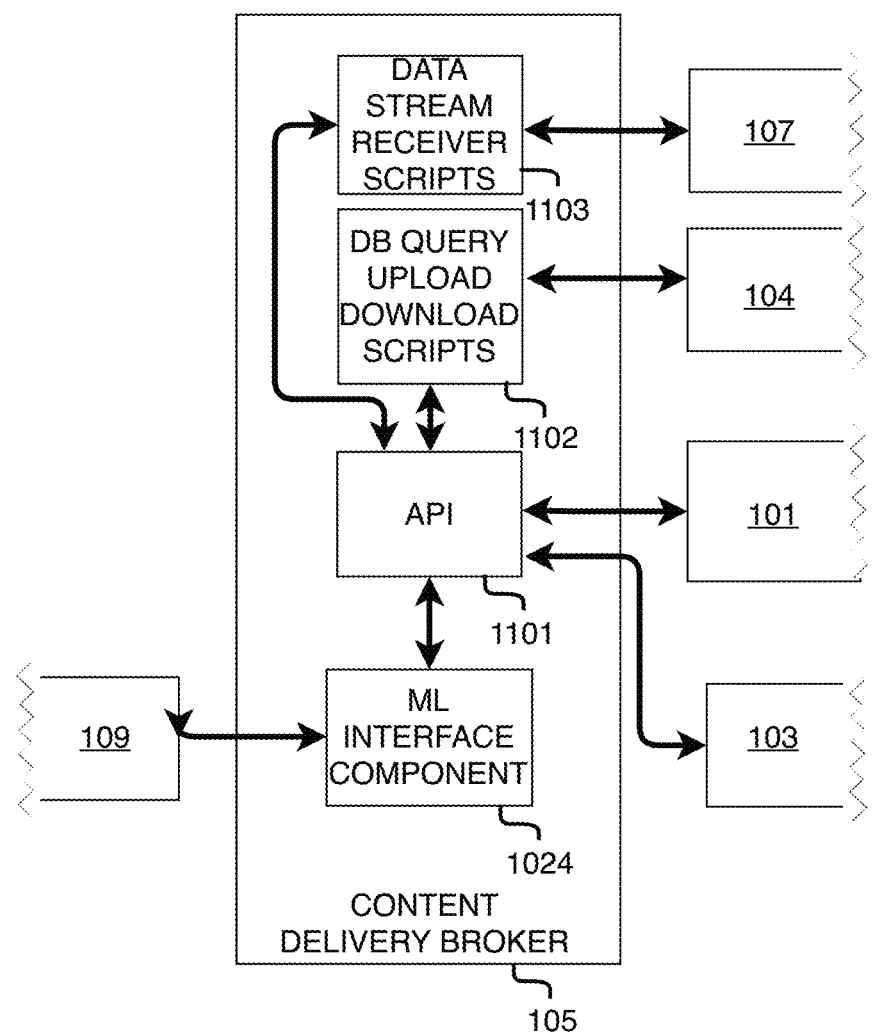
FIG. 9 shows the Content Delivery Broker Module.

As shown in FIG. 3, the System 100 has a Machine Learning Module 109 and/or one or more machine learning components 904, 1004, 1024, and 1314—as shown in FIGS. 7, 8, and 9. Each component includes one or more machine learning models. In one embodiment, FIG. 3, a central Machine Learning Module (MLM) 109 is stored in internal memory of the Server Device 20. In another embodiment, FIG. 8, a machine learning component 1004 is part of the Content Repository Module 104 and may be called upon by the other modules for access and assistance in machine learning. In another embodiment, one or more of the System 100 modules has its own resident machine learning modules with one or more machine learning models suitable for improving the tasks performed by the modules. In another embodiment, there is the central Machine Learning Module 109 that holds some machine learning models, and resident machine learning components in selected modules hold other machine learning models for the respective modules.

Data Flow and Data Types

Figure 4:
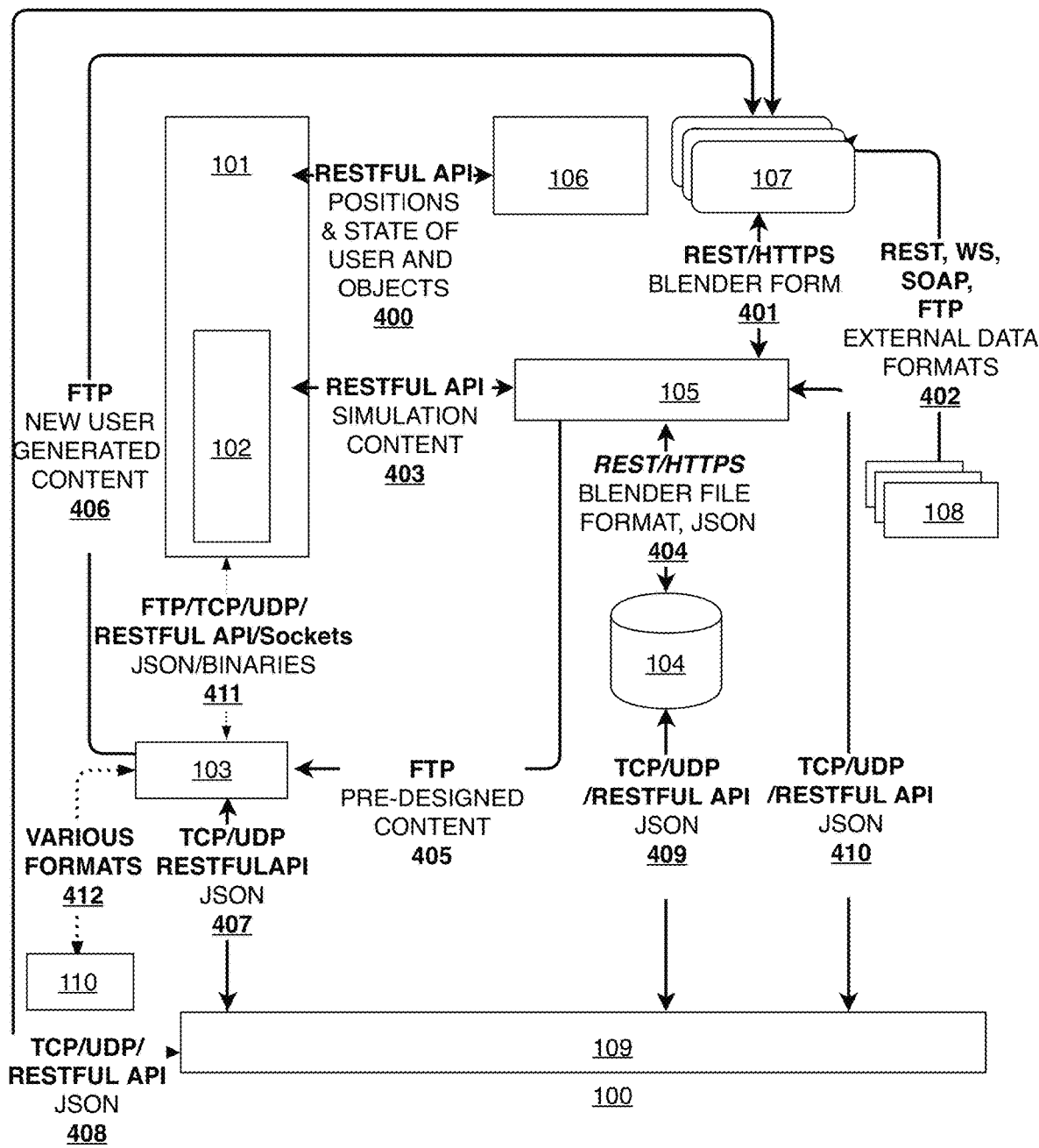
FIG. 4 shows a high level view of the data types and data flow among modules comprising the system architecture.

Turning to FIG. 4, it shows data flow among the modules in accordance with an embodiment of the invention. The following paragraphs describe examples of the type(s) of transport used to exchange and the types of data exchanged between each component. These are exemplary non-limiting descriptions, and alternative data types and communication methods are deemed within the knowledge of those skilled in the art. Moreover, other types of transport may be used, including and not limited to quantum data transports, radio frequency data transmissions, and transporting data via laser communications. In one embodiment of the System 100, all data (400, 401, 402, 403, 404, 405, 406, 407, 408, 409, 410) exchanged between all modules (101, 102, 103, 104, 105, 106, 107, 108, and 109) is formatted in a single data format, such as JSON, which . . . (i) minimizes storage requirements by maximizing reuse of data during delivery, operation, and replay, (ii) [more here] . . . . For example, in this embodiment of the System 100, Data 402 from External Data Providers 108 retrieved by the Data Ingest Translators Module 107, if said data is not in the native JSON format and thus must be translated, said data only needs to be translated once; and after ingesting and translating the data 402, the Data Ingest Translators Module 107 only needs to send the translated data 401 to the Content Delivery Broker Module 105 once. Upon receiving the translated data, the Content Delivery Broker Module 105 sends the same translated data to a plurality of different Client Devices 20 that are running the End-user Application Module 101 which, as stated, natively supports the JSON format, such as a PC Device 513, a VR Device 511, an AR Device 510, or a Tablet Device 512. In this embodiment, some data routed through the Content Delivery Broker Module 105 may be sent to the Content Repository Module 104 then stored in the Content Repository Module 104 database in the native JSON format; and later, when an End-user Application Module 101 running on Client Device(s) 20 requests the data attributed with said Unique Identifier from the Content Delivery Broker Module 105 no translation or conversion is required, because the requested data is already available in the Content Repository Module 104 and already formatted in the JSON format, which every End-use Application Module 101 supports, so the Content Delivery Broker Module 105 simply retrieves the data from the Content Repository Module 104 and sends it to the plurality of End-user Application Module(s) 101 that have requested or otherwise require the data. In another embodiment it may not be practical or possible to store a particular type of data in the native JSON format, such as if the data comprises an image, video, 3D model, script, or machine learning model. In such an embodiment, the system stores the data as a file object in the Content Repository Module 104 in an appropriate open source file format based on the type of data (i.e. .obj for 3D models, .mp4 for video) and also creates a file in the native j son file format that specifies the location of the aforementioned file object, the unique ID for the object, and other data or meta-data pertaining to the object, and stores the j son file in the Content Repository Module 104 database. In another embodiment, the System 100 natively supports a plurality of formats (i.e. .obj for 3D models, .mp4 for video) and thus these formats require no translation when said data formats are imported by the Data Ingest Translators Module 107 because all System 100 modules natively support the format that was imported.

In one embodiment of the system, data 400, which is data exchanged between the Multi-user Networking Module 106 and the End-user Application Layer 101, is exchanged via HTTPS communication and includes synchronized data, such as a unique identifier for each synchronized object in the Simulation, a unique identifier for the object's owner, the x, y, and z coordinate of the object (herein referred to as positional data), and physics characteristics such as mass.

Referring to FIG. 4, in one embodiment of the system, data 401, which is data exchanged between the Data Ingest Translator Module 107 and the Content Delivery Broker Module 105 is exchanged via REST/HTTPS and includes data re-formatted from one file or data format to another, or data ingested without reformatting when the format is supported natively by the system and thus does not require conversion. For example, this data may include 3D file formats such as .obj files and .fbx files, 2D file formats such as .mpeg or .jpeg, audio formats such as mp3, raw data formats such as .json or .csv, machine learning models, such as TensorFlow or OpenCV models, analytics models, and other mathematical models.

Referring to FIG. 4, in one embodiment of the system, data 402, which is data exchanged between External Data Providers 108 and the Data Ingest Translators Module 107 is exchanged via the communications protocol established by the external data provider, such as REST, SOAP, FTP, and RSS, and includes data provided by External Data Providers 108 formatted according to external data provider data models, such as JSON, XML, HTML, and .PDB. For example, this data may include formats not natively supported by the system.

Referring to FIG. 4, in one embodiment of the system, Data 403 is data exchanged between the Content Delivery Broker Module 105 and the End-user Application Module 101, is exchanged via REST and HTTPS communication, and includes all types of data formatted appropriately for the respective Client Device 10. This Data 403 consists of Models, Views, and Controllers (referring to the Model-View-Controller, or MVC, architectural pattern perspective and definitions well known by those skilled in the art) which comprise Simulation Content, including but not limited to Models such as algorithms, Views such as audio, visual objects, animations, and materials, and Controllers such as functions, scripts, and logic. The Model—View—Controller architectural pattern (usually known as MVC) is an architectural pattern commonly used for developing user interfaces that divides an application into three interconnected parts. The Model is the central component of the pattern. It is the application's dynamic data structure, independent of the user interface. It directly manages the data, logic and rules of the application. The View consists of any representation of information such as a 3D model, diagram, or visualization. Multiple views of the same information are possible, such as a bar chart for management and a tabular view for accountants. The Controller accepts input and converts it to commands for the model or view.

Referring to FIG. 4, in one embodiment of the system, Data 404, which is data exchanged between the Content Delivery Broker Module 105 and the Simulation Content Repository Module 104 is exchanged via REST and HTTPS and includes Models, Views, and Controllers discussed in PAR. [0091].

Referring to FIG. 4, in one embodiment of the system, Data 405, which is data exchanged between the Content Delivery Broker Module 105 and the Simulation Content Authoring Module 103, is exchanged via FTP and includes Models, Views, and Controllers, discussed in [0091].

Referring to FIG. 4, in one embodiment of the system, Data 406 exchanged between the Simulation Content Authoring Module 103 and the Data Ingest Translators Module 107 is exchanged via FTP and includes user generated or modified Models, Views, and Controllers discussed in [0091].

Referring to FIG. 4, in one embodiment of the system, Data 407 exchanged between the Machine Learning Module 109 and the End-user Application Module 101 is exchanged via REST and includes JSON.

Referring to FIG. 4, in one embodiment of the system, Data 408 exchanged between the Machine Learning Module 109 and the Data Ingest Translators Module 107 is exchanged via REST and includes JSON.

Referring to FIG. 4, in one embodiment of the system, Data 409 exchanged between the Machine Learning Module 109 and the Content Repository Module 104 is exchanged via REST and includes JSON.

Referring to FIG. 4, in one embodiment of the system, Data 410 exchanged between the Machine Learning Module 109 and the Content Delivery Broker Module 105 is exchanged via REST and includes JSON.

Referring to FIG. 4, in one embodiment of the system, Data 411 exchanged between the Content Authoring Module 103 and the End-user Application Module 101 is exchanged via protocols such as FTP, TCP, UDP, RESTfulAPIs, and Sockets and includes JSON files, Binaries, and Models, Views, and Controllers. Data 412 exchanged between the Content Authoring Module 109 and 3rd Party Software Applications 110 is exchanged via the same aforementioned protocols and includes the same aforementioned data types.

End-User Application Module 101

Figure 5:
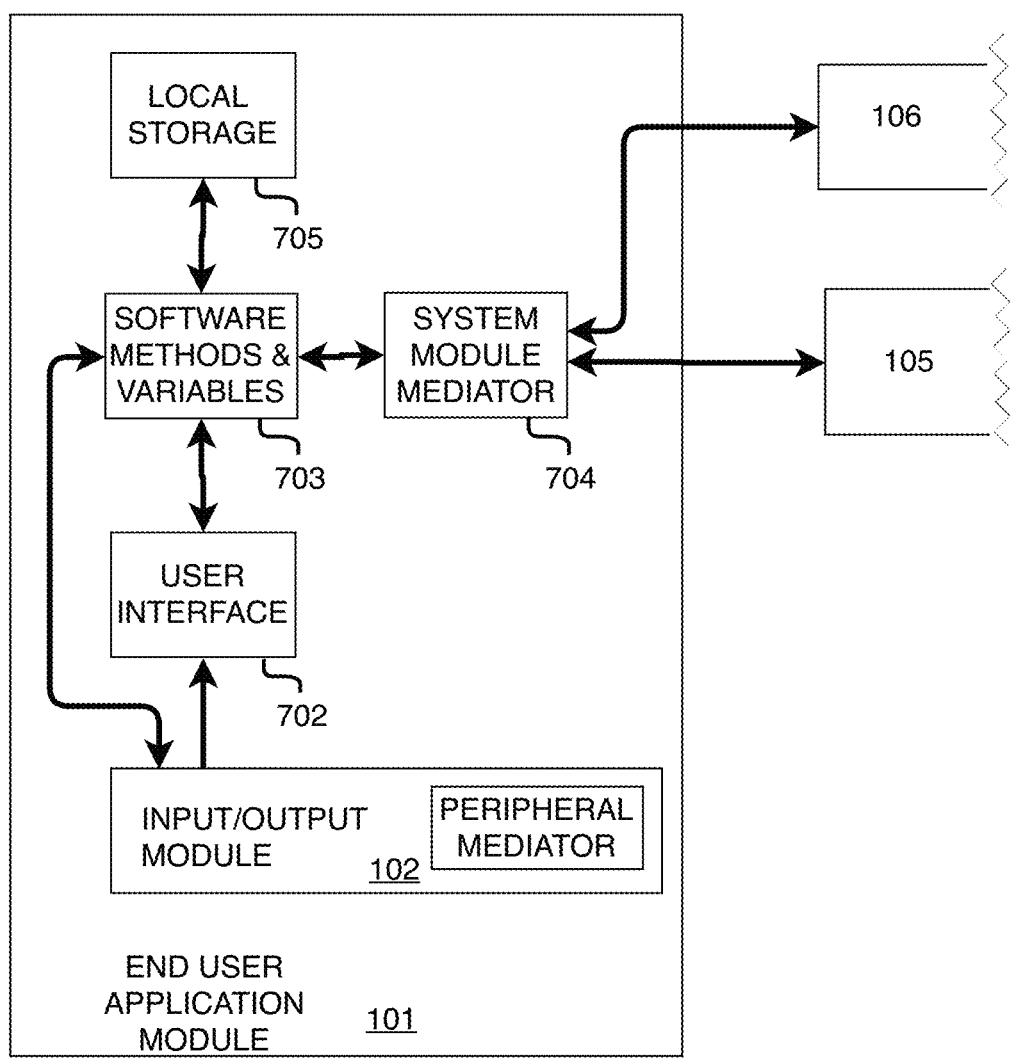
FIG. 5 shows the End-user Application Module.
Figure 6:
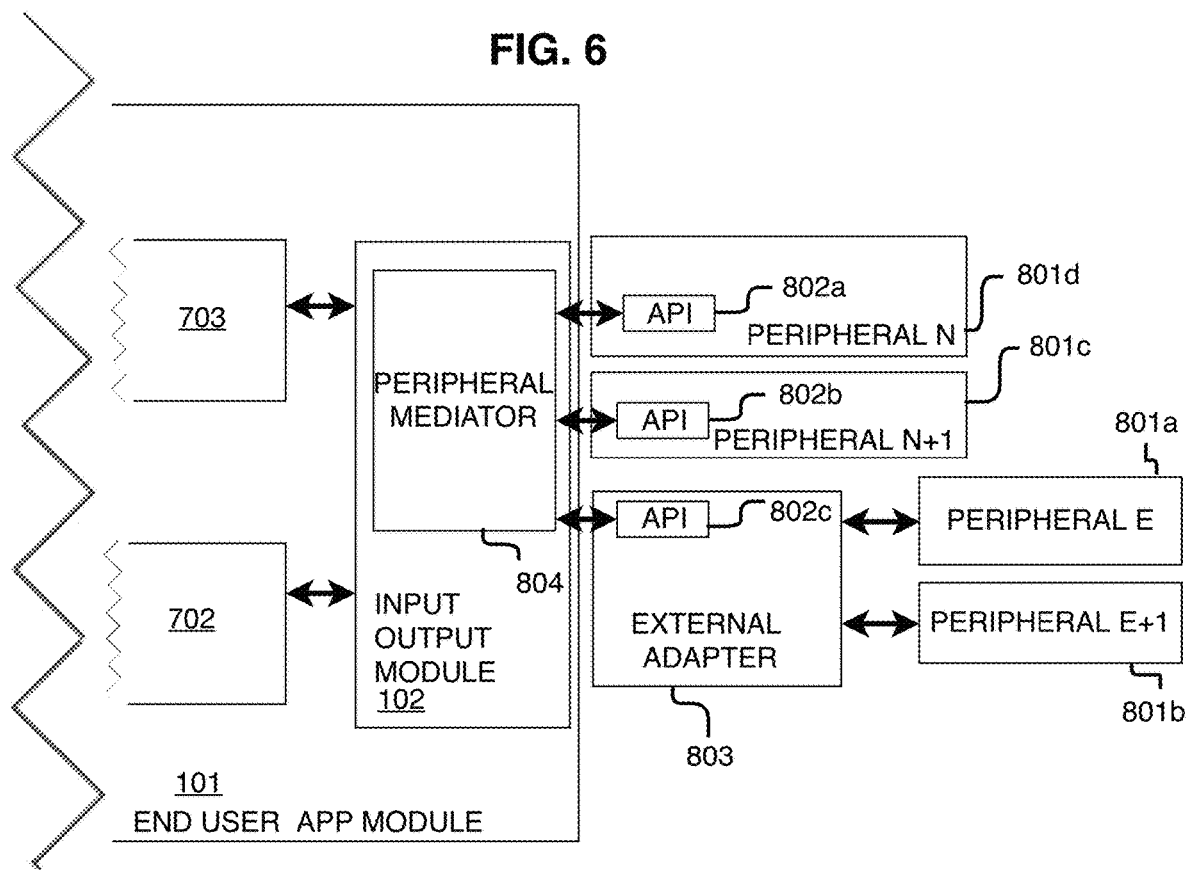
FIG. 6 shows the Input/Output Module of the End User Module.

The End-user Application Module 101 provides the end user with the following capabilities: (i) gives the user access to the system's local and server based software methods and/or services, (ii) limits said access according to the user's privileges and device, (iii) handles a portion of the system's computational workload, such as: rendering end-user graphics, calculating simulated physics, and encoding and decoding audio, (iv) manages the storage and caching of certain data locally in memory and permanent storage, including but not limited to method variables and returned values, (v) loads and installs plugins comprising methods which may or may not inherit from the application layer methods, application layer plugin methods, and server-side methods, and (vi) exchanges data with other components in the system, including exchanging data with the Multi-user Networking Module 106 and the Content Delivery Broker Module 105 through the System Module Mediator Component 704 of the End-user Application Module 101, as shown in FIG. 5, and exchanging data with Input and Output Peripherals 801*a-d* through the Input/Output Module 102, as shown in FIG. 6.

During the operation of the System 100, one or more objects (aka data) are needed by the End-user Application Module 101. For example, when a simulation is loaded by the End-user Application Module 101, there is a configuration file that specifies variables such as where the End-user Application Module 101 should retrieve data from, what objects (data) to retrieve, and what to do with the data once it is retrieved. Or, for example, in a multi-user simulation, when another user has added a new object to the simulation that is not already available in the user's End-user Application Module's 101 local storage or cache, the End-user Application Module 101 needs to retrieve these objects. In such cases (i.e. whenever one or more objects (aka data) are needed by the End-user Application Module 101) the End-user Application Module 101, requests the Content Delivery Broker Module 105 find the objects in either External Data Sources 108 via the Data Ingest Translators Module 107 or find the objects in the Content Repository Module 104 depending on what the user has selected. If the objects are found in the Content Repository Module 104, the Content Delivery Broker Module retrieves the object from the Content Repository Module 104 and sends it to the End-user Application Module 101. If the object is found in an External Data Source 108, the data is ingested and translated as needed by the Data Ingest Translators Module 107, sent to the Content Delivery Broker Module 105, where it may be sent for storage in the Content Repository Module 104.

During multi-user operation of the System 100, a set of variables that pertain to the content being viewed is measured and logged by the End-user Application Module 101 in real-time and sent in real-time to the Multi-user Networking Module 106, which then shares that information among users in real-time. The logged data that is shared among users is referred to herein as synchronized variables, or synchronized method variables. Generally speaking these variables are mathematical variables such as numbers (i.e. floats, integers, arrays), strings, and/or logical variables such as Booleans (i.e. true|false). For example, the logged variables could include the unique ID of the object(s) being viewed, the x, y, and z position of the user relative to the content, and other variables such as physics characteristics of the object being simulated (i.e. friction, mass, reflectivity). The synchronized variables are set to be synchronized by either the author of the content at design time or the end-user at runtime, and thus both the author and user have the ability to not synchronize variables if desired, and per their user privileges.

In accordance with an embodiment of the invention, the Application Layer of each End-user Application Module 101 provides its user with the ability to perform a set of methods defined by the application layer source code including but not limited to:

Start
Talk to other users
Check available content
Download new content
Instantiate content
See location of other users
Move content
Scale content
See Other Users
Move users
Send user's position
Create New Content
Update or Change Content As shown in FIG. 5, an End-user Application Module 101 has a System Module Mediator 704 that is coupled to the Multi-user Networking Module 106 and the Content Delivery Broker Module 105. The System Module Mediator 704 sends requests for data and results to the Multi-user Networking Module 106 and the Content Delivery Broker Module 105. The System Module Mediator 704 is also coupled to software methods and variables 703 that reside in local storage 705. The software methods and variables are coupled to a user interface 702 which is coupled to the Input/Output Module 102. The Input/Output Module 102 is also coupled to the software methods and variables 703, which together provide a pipeline for the end user to control the entire System 101.

Input/Output Module 102

Turning to FIG. 6, in accordance with one embodiment of the invention, the Input/Output Module 102 is a sub-component of the End-user Application Module 101 and comprised of one or multiple Peripheral Devices 801a-d, one or multiple Application Programming Interfaces (APIs) 802a-c, one or multiple Adapters 803, and a Peripheral Mediator 804. The Input/Output Module 102 allows a user to control the operation of the system using input peripherals, such as controls and/or other sensors, and receive the resulting output using output peripherals, such as video screens or displays and speakers.

Referring to FIG. 6, a Peripheral Mediator 804 is shown. Some peripherals 801c and 801d can communicate in a format compatible with the Input/Output Module 102 of the End-user Application Module 101. Those peripherals have application program interfaces 802a, 802b for translating the output of their respective peripherals into a data format compatible with the End-user Application Module 101. Other peripherals E and E+1, 801a, 801b, respectively, may output data or sensor signals not compatible with the Client Device 100. The outputs of peripherals 801a, 801b, and other non-compatible peripherals are connected to an Adapter 803 that has an application program interface for converting the output format of the peripheral signals to a format compatible with the End-user Application Module 101. To enable the seamless integration of these peripherals into the system, the Input/Output Module 102 is coupled to the user interface 702 and to the software methods and variables 703.

Referring to FIG. 6, Peripherals 801c, 801d are loosely coupled to the End-user Application Module 101 via the direct integration of the Peripheral Mediator Component 804 in the Input/Output Module 102, which is coupled to the User Interface 702 and the Software Methods and Variables 703, thereby allowing the End-user Application Module 101 to exchange data with each Peripheral. For example, the Input/Output Module 102 (i) receives input data, such as data from sensors that monitor the user's physical actions and biological status during simulations, including hand positions, heart rate, head rotation, head position, and the position of any other objects being tracked by the Input/Output Module 102 such as controllers, weapons, and duty gear, (ii) delivers output in the form of data that is translated automatically into sensory feedback including but not limited to visual, physical, and audible sensory feedback.

In accordance with an embodiment of the invention, the Peripheral Mediator 804 is a set of methods defined in machine readable code such as JSON, C# or Python that is configured to collect and aggregate data from a plurality of sensors using each different sensor's API, temporarily store said data in RAM, and then send a streamlined feed of the data to the End-user Application Module 101 for use in the methods being performed by the application layer and methods being performed by other components of the System 100 such as the Multi-user Networking Module 106.

The End-user Application Module 101, the Input/Output Module 102 and the Peripheral Mediator 804 are designed to be flexible to support variation in the volume and variety of sensor data being ingested from the Input/Output Module 102. This design pattern enables seamless communications between different components and supports easy maintenance of the code and modification to the sensor configuration.

Figure 22:
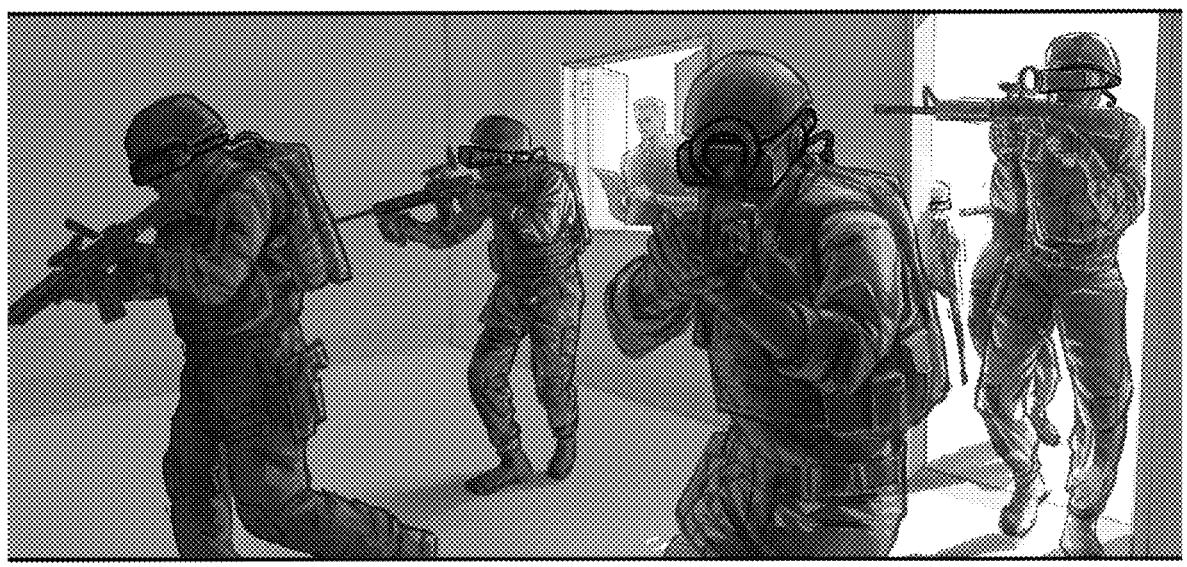
FIG. 22 shows a military training simulation.

In accordance with an exemplary embodiment for Military/Law Enforcement Training shown in FIG. 22, the Peripheral Mediator 804 mediates the exchange of data between the Input/Output Module 102 and input components, such that it receives, stores, aggregates, and sends to the End-user Application Module 101 data output by (i)

sensors in the Head Mounted Display, including but not limited to data captured by cameras, gyroscopes, and microphones, and (ii) additional sensors mounted external to the Head Mounted Display, including but not limited to sensors mounted to the user's body, weapons, and duty gear, with said sensors including but not limited to heart rate, temperature, skin elasticity, skin connectivity, buttons, IMUs, Electromagnetic Tracking Devices, LIDAR, and Infrared. The sensors located in the HMD, including but not limited to cameras, IMUs, and microphones transmit data to the Mediator through a USB cable connecting the HMD to the device running the End-user Application Module 101 using a set of APIs. A microphone embedded in the HMD detects and streams the user's voice to the Mediator through the same cable. One or multiple IMU(s), and/or Electromagnetic Tracking Devices, and/or buttons are affixed to the weapon to track its position and status in real-time and stream the data through a radio or wired signal to a receiver located in the device running the End-user Application Module 101. This de-coupled architectural design pattern makes it easier to accommodate hardware changes.

In the exemplary embodiment of the Military/Law Enforcement Training use case shown in FIG. 22, a user is equipped with a weapon that does not fire live ammunition. Instead the weapon mimics live fire by providing a haptic that simulates recoil of the weapon after the user pulls the trigger. In another embodiment of the same use case, the weapons do fire live ammunition. In both embodiments, the weapon is connected to the End-user Application 101 and is one of a plurality of peripherals 801 or 802. Referring to these embodiments, the Peripheral Mediator 804 detects when the user pulls their weapon's trigger, using the weapon-mounted button sensor that engages when the user pulls the trigger and subsequently sends a Boolean data "true" (stating shot fired) to the application layer via the Peripheral Mediator 804. The Mediator may also receive real-time data from other weapon mounted sensors, such as the IMU or Electromagnetic Tracking Devices, and calculates the position and rotation of the weapon based on said data such that it may then instantiate a virtual bullet in the location the shot was fired from in the direction the weapon was pointed. This allows the System 100 to accurately detect shots fired by the user from any angle and accommodates the integration of any type of weapon that has been adapted with a sensor supported by the system 100 through 804 or 803, including lethal and non-lethal weapons and new weapons as user needs evolve.

In accordance with an exemplary embodiment of the Military/Law Enforcement Training use case shown in FIG. 22, the user's hand and finger gestures are tracked using a hand-tracking sensor comprising of two or more cameras and a processing chip mounted on the front of the HMD or another position within the end-user system. The data collected by the hand-tracking sensor is sent to the Peripheral Mediator 804 through a USB cable that connects it to the device operating the End-user Application Module 101 using the protocol defined by the hand-tracking sensor's own API.

In accordance with the exemplary embodiment of the Military/Law Enforcement use case shown in FIG. 22, the Peripheral Mediator 804 mediates the exchange of data between the Input/Output Module 102 and output components. For example, the Input/Output Module 102 outputs a real-time video feed and audio feed rendered by the End-user Application Module 101 to the HMD, with said video rendered according to variables provided by the Peripheral Mediator 804 inputs, including but not limited to the HMD's sensors, which are used to derive the user's head position and rotation in the virtual environment, and the aforementioned peripheral devices.

In accordance with the exemplary embodiment of the Military/Law Enforcement use case shown in FIG. 22, the Input/Output Component 102 stimulates a user's visual, audible, and physical senses using various third-party output devices, including but not limited to (i) a VR HMD, (ii) a set of headphones, (iii) a compressed air recoil component on/in a firearm, (iv) linear resonant actuators or vibrating motors attached to the user's body, and (v) a Bluetooth enabled microprocessing unit connected via an adapter design pattern to other sensors.

In accordance with the exemplary embodiment of the Military/Law Enforcement use case shown in FIG. 22, the Peripheral Mediator 804 interfaces through a radio or wired connection with an External Adapter 803, such as an Arduino or Raspberry PI, which is interfaced with other input and output components such as haptic devices, weapon recoil devices, and biometric sensory processing, with said interfaces able to provide two-way data communication. The user's own firearm or less lethal device is retrofit with an output device that simulates the recoil of a firearm, with said output device communicating with the application layer via the external microprocessing unit, which is interfaced with the Peripheral Mediator 804 to allow the application layer to control the output, including but not limited to output in the form of simulated recoil when the trigger is pulled. The haptic devices make contact with the user's skin and vibrate at different intensities when certain events are detected by the End-user Application Module 101, such as getting shot or touched. This is possible through the combination of real-time positional data, such as the data provided by the Multi-user Networking Module 106, or data captured by the Input/Output Module 103, such as the position of the user's hands, virtual objects, and any munitions in flight. Based on the vector positions and trajectory of these objects, if a collision is detected, haptic feedback is triggered in the appropriate location of the user's body and at the appropriate intensity.

Simulation Content Authoring Module 103

Turning to FIG. 7, the Simulation Content Authoring Module 103 has an Application Programming Interface 901 that enables the Simulation Content Authoring Module 103 to communicate with third party design software to author content. End-user Application Modules 101 can be coupled or connected to the Simulation Content Authoring Module 103 to allow the end user to author content. In another configuration, the end user may use design software from third parties. The Simulation Content Authoring Module 103 has bidirectional communication with Data Ingest Translators Module 107 and the Content Delivery Broker Module 105. External Data Providers 108 are used by ingesting their data through the Data Ingest Translators Module 107 and Content Delivery Broker 105. With reference to FIG. 3, the Simulation Content Authoring Module 103 may also access content stored in the Content Repository Module 104. Content from any of the foregoing sources may be combined with new content authored on the End-user Application Module 101 or 3rd Party Software Applications 110 to provide new content. As shown in the FIG. 7, output content including data, scripts, and models 903 are fed to the Data Ingest Translators Module 107 to translate the inputs into formats compatible with other end user devices. The translated inputs are distributed by the Content Delivery Broker Module 105 to the other end user devices and stored in the Content Repository Module 104.

The Simulation Content Authoring Module 103 could be deployed in a variety of ways, such as being deployed as a Standard Developer Kit (SDK), as a plugin, as a service such as through a RESTful API, or as a combination of any of these. For example, as deployed as a SDK, the user could download the SDK as a .zip file or transfer it to local storage it from a removable storage device such as a USB Storage Drive or SD Card, unzip it, and import it into a 3rd party software application, and then that third party application would have access to the capabilities of the Simulation Content Authoring Module 103 through the imported SDK. Or, for example, as deployed as a plugin, the user could find the plugin in the 3rd Party Software Application's 110 plugin store, or through some other source, download it, install it, and then the 3rd Party Application Software 110 would have access to the capabilities of the Simulation Content Authoring Module 103 through the imported files.

Content Repository Module 104

Turning to FIG. 8, the Simulation Content Repository Module 104, which is also referred to herein as the Content Repository Module 104, comprises of a Database 1002 such as an unstructured database, for example a MongoDB database, which is a NoSQL repository, and an API 1001, which is coupled with the Content Delivery Broker Module 105 such that it may (i) receive data output by the Content Delivery Broker, (ii) store data it receives from the Content Delivery Broker Module 105 in a Database 1002, and (iii) output data stored in the database to the Content Delivery Broker Module 105 on demand. The Simulation Content Repository 104 internal data model comprises of a straightforward, low-maintenance data model comprising of key/value pairs implemented as JavaScript Object Notation (JSON). JSON is a lightweight, human-readable, vendor-agnostic, data interchange format. We have chosen this data model to simplify data retrieval and storage at the application layer and for its portability to virtually any repository. This approach aligns with today's lightweight application layer technologies for data retrieval and parsing. The Data Ingest Translators Module 107 and the Simulation Content Repository 104 utilize open source and freely available libraries for reading and writing JSON to and from the repository. In some cases data must be stored in other formats besides JSON, such as Video, Images and Audio files, and in these cases the 107 and 104 utilize open source and freely available libraries for reading and writing the data from the unsupported format to a supported native supported format and for storing the data in the repository. Our approach is based on independent standards, open source and freely available repositories, data formats, and libraries to keep total cost of ownership (TCO) low. This approach allows for the portability of these technologies to new platforms providing the end user with complete freedom to swap tools in and out to accommodate change in enterprise directives as it relates to approved software products. For example, our MongoDB approach can easily be replaced with a Hadoop NoSQL solution, which requires little to no re-work. Our architecture and technology selection have sufficiently created a level of abstraction and decoupling between components, allowing for the selection of new products while minimizing impacts to the code base. This aligns to one of our cores overarching architectural tenets of remaining vendor agnostic.

Content Delivery Broker Module 105

FIG. 9 shows an embodiment of the Content Delivery Broker Module 105. The Content Delivery Broker Module connects directly or indirectly to virtually all the other components of the System 100. It receives request(s) for data that may be inside or outside the System 100. It locates where the data is, retrieves it, gets it translated into formats compatible with the all the components of the System 100 that will use the data, and finally delivers the data to the components that request or require the data. For example, one end user may request data that is outside the system, but all the end users will need to see the data if the data alters the scenario of the System 100. By routing the data first to the Data Translators Module 107 and then to the end users via the Content Delivery Broker Module 105, the System 100 ensures that all End-user Application Modules 101 receive data compatible with the end user devices.

The Content Delivery Broker Module 105 comprises of (i) a Restful API, (ii) a model-view-controller design pattern, (iii) embedded software code in the End-user Application Module 101, and (iv) translators, which work in tandem to (i) receive input from the Data Ingest Translators Module 107, (ii) receive input from the Content Repository Module 104, (iii) output portions of the data received from the Data Ingest Translators Module 107 to the Content Repository Module 104, (iv) exchange data with the ML Module 109, (v) and output portions of the data received from the Ingest Translators Module 107 to an application running in the End-user Application Module 101 and the Simulation Content Authoring Module 103, (v) output the data received from the Content Delivery Broker Module 105 to an application running in the end user module 101.

In accordance with an embodiment of the invention, the Content Delivery Broker Module 105 loosely couples the application layer with the Simulation Content Repository Module 104 through a Restful API. By making simple requests through the API (such as Get, Put, Post, and Delete requests), the Content Delivery Broker Module 105 is able to access a JSON data set containing information about the Simulation Content presently available on the Simulation Content Repository Module 104. The Content Delivery Broker Module 105 uses this live JSON dataset to populate key variables when called upon by the application layer to download, cache, and initialize the content.

In accordance with one embodiment of the invention, the Content Delivery Broker Module 105 also configures the content at runtime and design time, including but not limited to configuring the content's quality for consumption by many different device types, according to the optimal specifications of the different devices. The Content Delivery Broker Module 105 is coupled to each End-user Application Module 101, so it routes the data from the Data Ingest Translators Module 107 in the format compatible with each of the End User modules 101.

In accordance with an embodiment of the invention, during multi-user simulations, when the Content Delivery Broker Module 105 sends content to a user in an active simulation, it also disseminates the content to all other active users in the session. As training events occur, the position and status of each object comprising the simulation is passed among users with a light-weight TCP approach, a capability provided by our Multi-User Networking Component 108. This dissemination/synchronization technique promotes ease of use by eliminating the need for everyone to perform setup actions manually.

In accordance with an embodiment of the invention, the Content Delivery Broker Module 105 architecture also minimizes storage requirements by maximizing reuse of data during delivery, operation, and replay. This is accomplished by a decoupled data architecture eliminating the need to store multiple copies of data.

In accordance with the exemplary embodiment of the Military/Law Enforcement use case shown in FIG. 22, each training event comprises of generic, reconfigurable simulation content including avatars, buildings, terrain, weather elements, and other assets. At the beginning of the training event, these assets are set-up according to the simulation's configuration file, which establishes where the object file is located, how the object looks, acts, and responds based on float variables or tags. The configuration variables contained in the configuration file can also establish if and how objects react to live, external data. For example, a rain asset can be configured with a float variable for intensity ranging from 0-10. The intensity can be set to respond to real-time weather data, according to data from a live, external weather database, whereby the source of the live data could be established in the simulation's configuration file, as well as how the virtual rain asset responds to the different values of the data.

In accordance with the exemplary embodiment of the Military/Law Enforcement use case shown in FIG. 22, the user may record the simulation for later re-playing. When doing so, the System 100 only needs to store a time-stamped list of the Unique ID for each active object in the simulation along with the relevant positional and status data (such as vector coordinates, trajectories, and human readable string tags) for these objects. This tremendously reduces the storage required to deliver replay capabilities by allowing the System 100 to rebuild the entire training event by fetching the event's simulation assets stored in the Simulation Content Repository Module 104 and using the recorded data (such as vectors, trajectories and events) with timestamps to re-map the event. This eliminates the need to duplicate the simulation content for every training event. In one embodiment, the only data that gets stored for each training event is the user's and object's position data, represented by x, y, and z coordinates which requires very little storage. This decoupled data architecture maximizes the portability of the data and the content repository by keeping storage requirements at a minimum. This minimizes the overall hardware burden of the entire solution, keeping the hardware deployment footprint as small as possible with portability in mind.

Multi-User Networking Module 106

Figure 10:
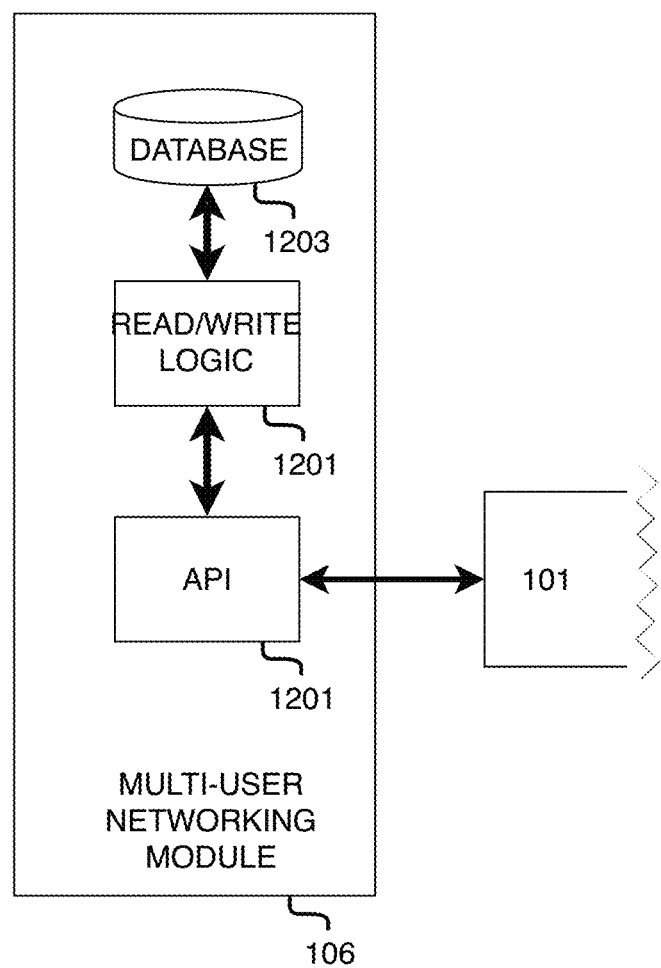
FIG. 10 shows the Multi User Networking Module.

Turning to FIG. 10, the Multi User Networking Module 106, like all of the System 100 Modules, can be implemented on a Server Device 20, such as a bare metal server or a commercial cloud server. Its components comprise a database, such as a MONGO database 1203 that allows easy movement of data to and from Multi-user Networking Module 106. The database 1203 is bidirectional coupled to read/write logic 1201 which is also bidirectionally coupled to an API 1201 for inputting and outputting data to each end user 101.

The primary function of the Multi-user Networking Module 106 is to receive real-time data from the End-user Application Module, wherein said data has been defined as synchronized variables, and send said data to other active users in the simulation. To provide this service to the system, The Multi User Networking Module 106 comprises of a set of software methods that are stored in local or cloud storage and interfaced with the End-user Application Module 101 layers through the System Module Mediator 704 which uses APIs, for synchronizing data among users, with said data including but not limited to vector data stating the position and rotation of objects and the users, event data, and other data related to the objects active in each End-user Application Module 101. Upon receiving the data from the Multi-user Networking Module 106, the End-user Application Module 101 updates the user's visualization accordingly, such as moving objects, retrieving objects as necessary from the content delivery broker, and changing the state of objects such as animating them or blowing them up. This allows geographically disparate users to see the same content in a way that is synchronized and interactive.

To demonstrate the modularity of the system and the interchangeability of the modules, consider how the physical configuration of the Multi-user Networking Module 106 could be different depending on client needs. For example, in one example deployment of the System 100, the Multi-user Networking Module 106 uses a commercially available and licensed software named Photon Networking, which is costly, uses its own proprietary methods, and requires the Windows operating system. In some cases, the customer may want to use Photon Networking as the Multi-user Networking Module 106, which is possible due to our vendor agnostic and decoupled architecture. Alternatively, in another example deployment of the System 100 the customer may want to use a less proprietary and less expensive Multi-user Networking Module 106, and most importantly a module that runs in the LinuxOS, and in that case the Multi-user Networking Module 106 could be deployed as an open-source application or as a closed-source application that was purpose built for that customer. Either way, the System 100 uses load balancing and other techniques from the Massive Multiplayer Online (MMO) gaming industry, especially within the Multi-user Networking Module 106, to support massive flexibility in the volume of users the System 100 is able to support. The software is architected to scale horizontally as additional hardware is added. Our modular software approach allows many instances of our software components to be dynamically provisioned in an elastic manner as demand increases and decreases. The software architecture has been designed with ease of deployment in mind. Our solution can be deployed to non-proprietary, commercially available commodity hardware and operating systems. Like all other components of the System 100, the Multi-user Networking Module 106 is able to run locally (aka on premise) or on cloud resources depending on the physical configuration required by the customer. In addition, as mentioned previously with other components, the Multi-user Networking Module 106 is able to run on bare metal (a physical server dedicated to a single user so the user may optimize the server according to the user's needs for performance) and thus can be leveraged for portable, localized on-premise training deployments.

In one embodiment of the System 100 all the End User Applications send and receive data in a common format and the entire System 100 operates on a bare metal server. In such an embodiment there may be no or minimal need for Data Ingest Translators Module 107. In other embodiments, even when using a bare metal server, there may be a need or option for acquiring data from External Data Providers 108 and Data Ingest Translators Module 107 are needed. In still further embodiments the End-user Application Module(s) 101 rely upon different formats. In such embodiments the Multi-user Networking Module 106 is coupled to the End-user Application Module 101, which allows the Multi-user Networking Module 106 to be informed of the content presently active among users, (defined by Unique IDs, see PAR 0070); and according to that information, the End-user Application Module 101, through its coupling with the Content Delivery Broker Module 105, which is also coupled to the Data Ingest Translators Module 107 is able to retrieve the data in a suitable and/or compatible format for each End-user Application Module 101.

Data Ingest Translator Module 107

Figure 11:
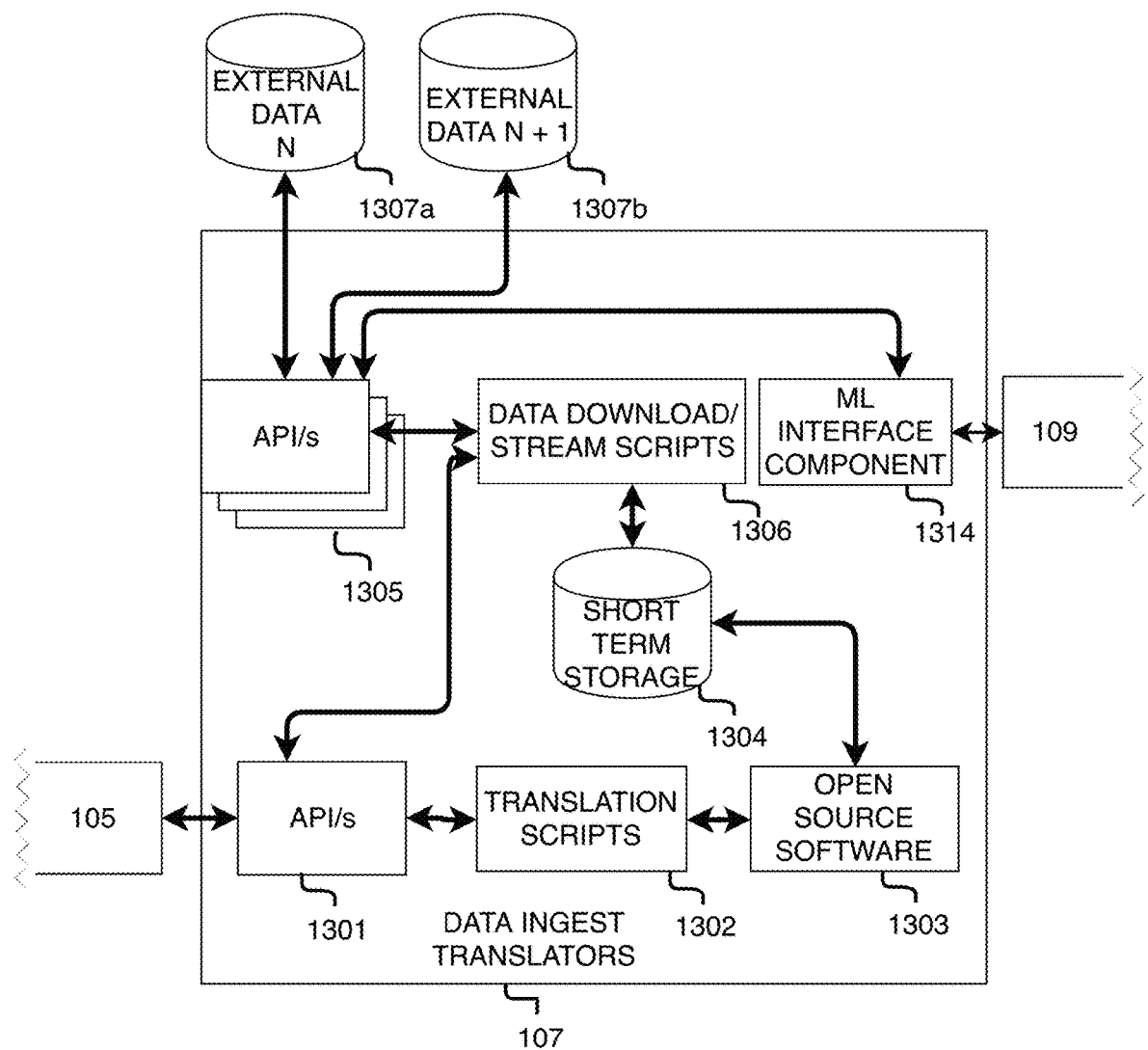
FIG. 11 shows the Data Ingest Translators Module.

Turning to FIG. 11, the Data Ingest Translators Module 107 comprise independent software modules containing a set of methods capable of converting data from one format to another format at design time and/or runtime and outputting the converted data to the Content Delivery Broker Module 105, such that said data can be used by the System 100 at design time and/or runtime and/or stored in the Content Repository Module 104, said data input including (i) external data and (ii) data output by the simulator authoring tools to generate outputs for the Content Delivery Broker Module 105. In one embodiment of the invention, the System 100 routes all data from external and internal sources through the Data Ingest Translators Module(s) 107 to ensure a copy of any requested data will be available to End-user Application Module 101 in a data format compatible with each End-user Application Module 101. The Data Ingest Translators Module(s) 107 holds and/or accesses from External Data Providers 108 a plurality of translators for translating data from one format in the external provider to one or more formats compatible with the modules of the System 100. The translated data is brokered and delivered to the respective End-user Application Modules 101 by the Content Delivery Broker Module 105. Content authored by one end user may be stored in the Content Repository Module 104 and reside there in the format of the authoring end user. When the content is requested for a simulation, if it is necessary to translate the content to make it compatible with the requesting End-use Application Module 101, the stored content is routed by the Content Delivery Broker Module 105 to the Data Ingest Translators Module 107 to generate data in formats compatible with each end user module 101. In an alternate embodiment, the authored content may be translated and stored in compatible data formats for delivery by the Content Delivery Broker Module 105.

In accordance with one embodiment of the invention, the Data Ingest Translators Module 107 is written in the Python programming language and ingest and parse content from External Data Providers 108 and convert the data formats into the native JSON format used within the System 100. In cases where the JSON format is not used, such as with Images, Videos, and 3D models, a native non-proprietary data file format is used, such as .obj for 3D models or .mp4 for videos. The internal data format can be easily extended to accommodate new attributes introduced by External Data Providers 108. This design pattern maximizes the flexibility and utility of the system. This feature allows the System 100 to be content agnostic enabling the ingestion and use of virtually any data format. A design-time translator maps and translates data provided by an external data provider to the standardized internal data format used by the System 100. This is necessary for local on-premise deployments of the invention where access to an enterprise network such as NIPRNet (Non-classified Internet Protocol (IP) Router Network), SIPRNet (The Secret Internet Protocol Router Network), or JWICS (The Joint Worldwide Intelligence Communications System) is unavailable. When training events are being conducted on these enterprise networks, run-time translators can be used to retrieve content from external data sources providing the system environment the most current and up to date simulation data. Run-time translators map and translate the data at run-time based on schemas and interface documentation provided by External Data Providers 108 or by the same provided by the Content Delivery Broker Module 105.

External Data Providers 108

There are a plurality of External Data Providers 108 with many data sources N, N+1 . . . N+n in one or more external databases 1307a, 1307b, . . . 1307z, 1307aa, 1307ab, . . . 1307az. The External Data Providers 108 may be called upon, through the Content Delivery Broker, by the End-user Application Module 101, the Simulation Content Authoring Module 103, another user on the Multi-user User Networking Module 106 and the Simulation Content Repository 104. One or more APIs 1305 are associated with the requested external data source to receive data in the format output by the source. The received data are output to the Data Download Stream Scripts 1306 that inspects the data for compatibility with the requestor and with other end users. Compatible data is output via APIs 1301 to the Content Delivery Broker Module 105 for delivery to the requested system component. Non-compatible data are stored in short term storage 1304 where they are fed into open software applications 1303 and then translated into compatible data by module 1302. After translation the compatible data is/are sent to the requested component and to any other components that will require translated formats. For example, a tablet may request data from an external data provider and the format may be compatible with the tablet, but not with a personal computer or an augmented reality head mounted display. The compatible data will be output to the tablet via the Content Delivery Broker Module 105. The data will then be translated via components 1304, 1303, 1302 and 1301 for delivery to the personal computers and the head mounted displays in a format each may use.

Machine Learning Module 109

All the machine learning components enable the system modules and components to be controlled by or use machine learning models during operation. The main purpose of the ML module 109 and components 904, 1004, 1024, and 1314 is reduction of the cognitive load associated with operating the System 100. For example, the ML component 904, FIG. 7, allows the Simulation Content Authoring Module 103 to create content autonomously, which eliminates the need for a human to manually exert effort into conceptualizing and creating the content. This is accomplished through a system learning function enabled by ML technology and algorithms. The machine learning model (algorithm) utilizes content that has been previously ingested into the System 100 as a training dataset. The System 100 audits and logs end user interaction being performed on the datasets being used for the exercise. Analytics within the ML module 109 and components 904, 1004, 1024, and 1314 perform an assessment on the end user audit and log data, which, combined with the feature extraction performed on the training data set, enable the system to generate new content that is reflective of the training data set and contextually correct. The ML component 904 is able to ingest models from external sources through the Data Ingest Translators Module 107 and Content Delivery Broker Module 105.

In another embodiment a machine learning component can exist in internal system storage, such as being stored as an object in the content repository 104. In most cases these models do not need to be translated, they simply need to be ingested—because the Machine Learning Module 109 supports most of the widely used industry standards such as TensorFlow models, OpenCV models, OpenVINO models, and more. In cases where the models need to be translated, the Data Ingest Translators Module 107 perform this function according to the same steps used to translate other types of data. The ML component(s) load the external ML model(s) at run-time and uses them to perform functions according to the configuration of the system.

In one embodiment of the invention, the System 100 is configured such that there is an external ML model from External Data Providers 108 loaded by the ML Module 109 at run time for each of the main components of the System 100 (i.e. Content Delivery Broker 105, Simulation Content Repository Module 104, Data Ingest Translators module 107, etc.). By way of example only, the following paragraphs describe the function that each ML Model provides to its respective component.

For the Content Authoring Module 103, FIG. 7, the ML Module 109 or a resident machine learning component 904 automates the creation of new content based on criteria set by the user. For example, referring to the military simulation use case, an author can add a hostile character to the scenario and set the hostile character to either autonomously attack the trainee or run. When the trainee loads the simulation, the object the author created appears in the trainee's environment. And then, according to the pre-trained machine learning model loaded by the ML Component 904, the actions and position of the hostile are controlled autonomously in a way that never required a human to program or animate the hostile object's actions or movements. In another example of this capability, the system creates content autonomously based on the prior content the user has engaged with and their performance with said content.

For the Content Delivery Broker Module 105, FIG. 9, either a central ML Module 109 or a resident machine learning component 1024 provides recommendations to the user based on prior use. For example, referring to the military simulation use case, a returning user who has demonstrated a lack of pistol skills is provided by the Content Delivery Broker Module 105 with a list of simulation content recommendations oriented around improving their pistols skills. This capability is performed by integrating system learning functions implemented as rules leveraging user audit and log data and content authoring that results from ML algorithms.

For the Content Repository 104, FIG. 8, machine learning algorithms execute natively on the machine learning content 1004 stored in the repository. The content in the repository serves as the training data set.

As one example of the Machine Learning capability, referring to the exemplary embodiment of the Military/Law Enforcement Training use case shown in FIG. 22, one or more of the embodiments of the System 100 may include an Intelligent Tutor (ITutor) component using the ML Module 109. The ITutor component captures and logs data related to each training repetition using the End-user Application Module 101, and sends that data to the ML Module 109, which detects the user's events and scores based on real-time analytics. Using a basic statistics approach, in which key variables are manually identified to serve as performance indicators (e.g. mortality rate, lethality, weather/lighting conditions, position of adversary, etc.), the ITutor component detects the user's deficiencies or strengths (such as poor performance with a pistol at night in the rain, or excellent use of cover in all conditions). The ITutor develops and maintains a baseline average for the population (all users) for each key variable. Compared to the baseline, each user's skills will be automatically and ongoingly assessed based on their performance. The simulations are then altered accordingly to challenge the user appropriately by modifying the intensity of the variables correlated with the performance indicator. For example, expanding on the example above, for the user performing poorly with a pistol at night in the rain, after identifying this user's deficiency, the System 100 will autonomously create and deliver more training exercises to the user oriented with a pistol at night in the rain. Or, if the user has been getting shot from the left in close quarter combat more often than other users (compared to the baseline), our system creates and delivers more training exercises for the user oriented around adversaries to the user's left.

During each exercise, our system will use these performance indicators to populate the User Interface (UI). These UIs allow the users, such as a trainer and trainee, to remain informed of what is happening, why it is happening, and how to improve training outcomes. When interfaced with the ITutor component, the System 100 allows the user to receive this information in real-time, and in a way that is simple to understand using 2D visuals, iconography, and text. Furthermore, during the simulations, the type and detail of data provided as guidance to the trainee will be reduced as he/she advances to increase the challenge and similarity to the real world as the user progresses.

One way the System 100 assesses the user's performance is a simple logic gate for performance metrics, with ranges that establish events based on the metrics. For example, if the user has not obtained the minimum required 95% effectiveness in a given exercise, a logic gate may prohibit the user from advancing to a more challenging level. This allows the challenge to progressively increase as the trainee advances through the training levels and allow the System to decrease the challenge if the trainee experiences difficulty achieving the standards. Additionally, using the same method, after each session is completed, the trainee will receive tailored feedback in the After Action Review that is based on quantitative progress derived from these key variables. Based on poor performance metrics, a trainee is able to (or may be required to) go back to a prior level to focus on a single or multiple deficient skill(s). Using these methods, which are aligned with our overall architectural tenet of extensibility, the ITutor component provides the intelligent tutor capabilities to all trainees and allow military and police forces to employ pedagogical techniques that are suited to the specific training objectives of the event and domain being taught. The design and adherence to our architectural tenet of extensibility allows it to expand with the need to incorporate new performance indicators, analytics models, machine learning capabilities, sensors, and more.

As another example of the Machine Learning capability, one or more of the embodiments of the System 100 may include an After Action Review (AAR) capability, whereby the AAR capabilities are provided by or as a subcomponent of the ML Module. The AAR provides users with a portal to review qualitative and quantitative analytics and scoring data gathered while training in System 100 and re-create the training scenario. The AAR allows trainers and planners to observe objects in the simulation and populate an AAR Database in real time with positional and event information. From the raw data, the system will use a series of logic and formulas to determine analytics including force applied, rounds fired, shot placement, time to target acquired, barrel aim, objects impacted, reaction times, hits or misses if engagement occurs, devices used, and the length of interactions. These analytics will be recorded in a document database that is flexible in the volume and variety of data it can store. The database employs the same design and approach as the Content Repository 104, with the addition of a server-side statistical analysis and output feature. Server-side analysis are performed using R, a free software environment for statistical computing that compiles and runs on a wide variety of platforms. Integrating R provides us with the ability to utilize a breadth of open-source, well-documented, and maintained packages for conducting statistical/data analysis, including supervised and unsupervised machine learning. The output feature uses the same framework as our RESTful web services API (in our Content Broker 105), which provides a secure interface for other systems to access data in our repository.

The AAR User Interface provides the trainer with the ability to monitor, enable, or disable analytics and scorekeeping during the exercise. The exact variables and scoring logic may be remotely set, by the content creator, the trainer, or the trainee, based on user privileges, without impacting the database or the application, due to the flexibility and robustness of the System 100.

Server 20 Deployment (Hardware)

All executables and data required to operate the System 100 modules deployed to Server Devices 20 can be configured and deployed to bare metal servers or shared compute resources such as a commercial cloud. The solution is able to operate in a virtualized or container-based enterprise environment implemented on-premise or utilizing commercial cloud technologies such as Amazon C2S. Virtualization helps to maximize the investment made by the enterprise in existing hardware resources by leveraging idle compute cycles. Virtual hosts provide a variety of functions and mission capabilities that run alongside one another on the same bare metal hardware. This deployment approach maximizes hardware resource utilization, power, space, and cooling. Similar to virtualization, our solution is also capable of executing in a containerized environment. Like virtual hosts, many containers providing a variety of mission functions can execute on the same bare metal implementation. Containers provide the ability to encapsulate an entire application and its host operating system. Containers differ from virtual hosts in that all containers share the base operating system running on a bare metal instance. The value of a containerized deployment is that all dependencies required for an application to execute are self-contained in a container. The benefit this approach offers to the mission is consistent solution deployment across networks. For example, containerized solutions developed on NIPRNet (Non-classified Internet Protocol (IP) Router Network) can be deployed to SIPRNet (The Secret Internet Protocol Router Network) and JWICS (The Joint Worldwide Intelligence Communications System) environments while minimizing downstream configuration changes. The only configuration changes required between networks are to external interfaces. All other configuration changes to application servers and databases are encapsulated in the container, which guarantees applications will function the same across all networks.

In one embodiment, the Server 20 executes within a small hardware footprint requiring a single Quad Core server with 16 GB of RAM and 5 Terabytes of hard disk space. The solution can be deployed on-premise within a local network or using commercial cloud technologies. Should the system require scaling beyond the capabilities of a single computing unit, the software architecture is well-positioned to support a distributed software and server architecture to meet the increased demand.

The software architecture has been designed to respond in an elastic manner at runtime and only use the resources necessary for the system at the time—employing tactics including light-weight application layers, containerization, virtualization, and load balancing.

Client Device 10 Deployment (Hardware)

As noted in FIG. 3, the client software environment has been implemented to use a single module that runs on a Client Device 10, the End-user Application Module 101, which contains the Input/Output Module 102 as a subcomponent. The End-user Application Module 101 is a device agnostic, light-weight application which allows it to be deployed across a range of different device types (such as a PC, Tablet, AR Head Mounted Display, or VR Head mounted Display).

The underlying architecture of the System 100 allows for the deployment of the modules shown in FIG. 3 on non-proprietary, commercially available commodity hardware and operating systems. These components of System 100, proven methods, and techniques provide a framework that is extensible and scalable.

The End-user Application Module 101 that runs on a Client Device 10 can be updated from the system Server 20 after the initial installation of the System 100. This eliminates the need for an operator or system administrator to manually update each individual Client Device 20. The host operating system for each Client Device 10 will require periodic updates for security patches and other operating system patches which will be provisioned from the server. This further eliminates the need for an operator or system administrator to maintain individual Client Device 10. System checks will be performed upon powering on of client computers when connected to the network (either cloud based or on-premise).

Embodiments of the System 100 have long-term operability by allowing for easy setup, an intuitive user experience, powerful end-user functional capabilities, and seamless integration of/with COTS technology and existing government and police systems. Some embodiments include end user devices that are wearable and able to operate in any unobstructed indoor or outdoor space.

Exemplary Use Cases

Turning to FIG. 12-19, these illustrate a non-limiting exemplary use-case whereby the invention is used for the demonstration, marketing, rental, and sale of real estate properties such as land or commercial buildings. In this use case, a salesperson uses the End-user Application Module 101 to control the content being viewed by other users, for example, such as controlling (i) which property is being viewed by a group of prospective buyers located in geographically disparate location, (ii) the virtual location of the viewers, and (iii) other characteristics of the building, including but not limited to lighting, materials, landscape, surrounding terrain, data overlays, animal and human avatars, and vehicles. The location of all viewers is represented by avatars in the virtual environment such that all users see and hear the other users as if they were in the same physical space.

In use and operation, the System 100 may operate to allow multiple users to participate in a common real estate scenario or presentation while being in different locations or a common location. Each user may have a device identical to other users or all users may have different devices or combinations of some identical and some different devices. Each user may see the other users as avatars in presentation.

Figure 12:
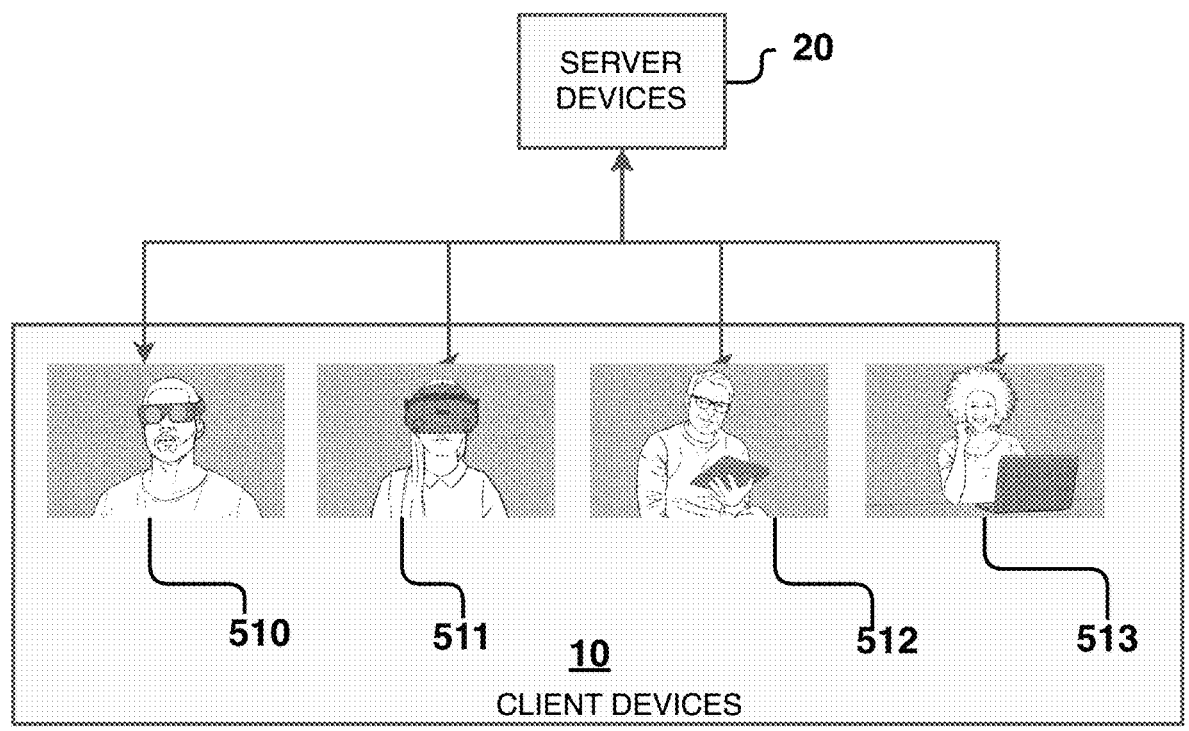
FIG. 12 shows the client devices interfaced with the server devices.
Figure 13:
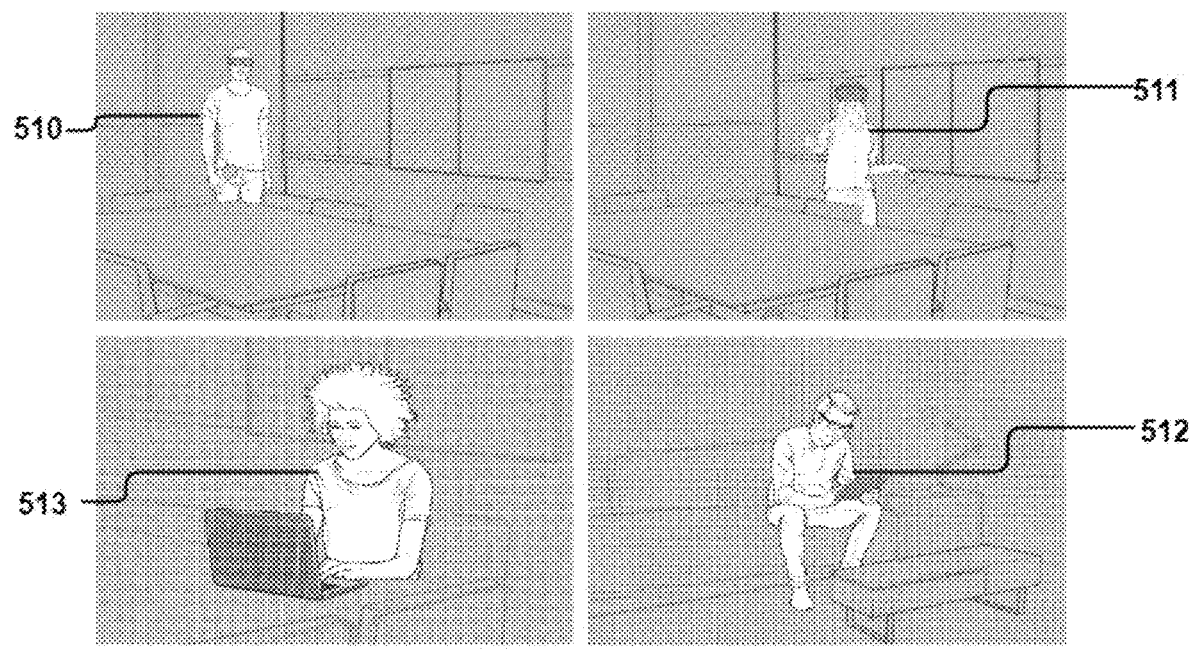
FIG. 13 shows users accessing the system from different devices in different locations.
Figure 14:
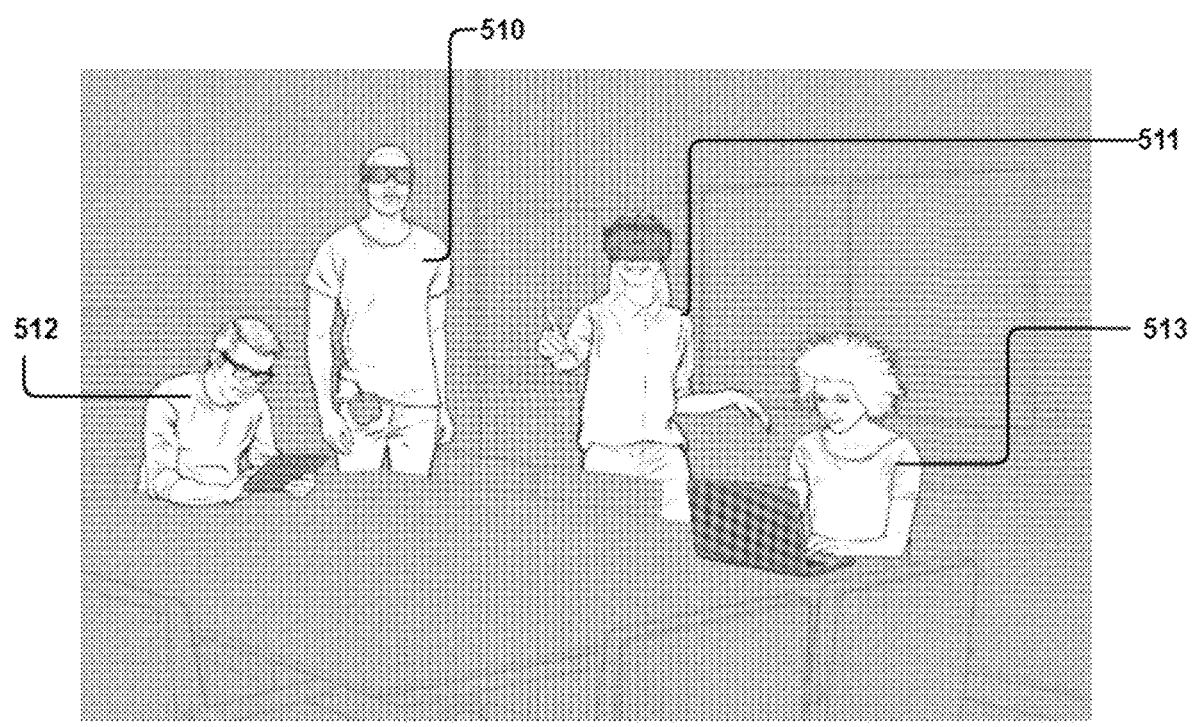
FIG. 14 shows users accessing the system from different devices in the same location.
Figure 15:
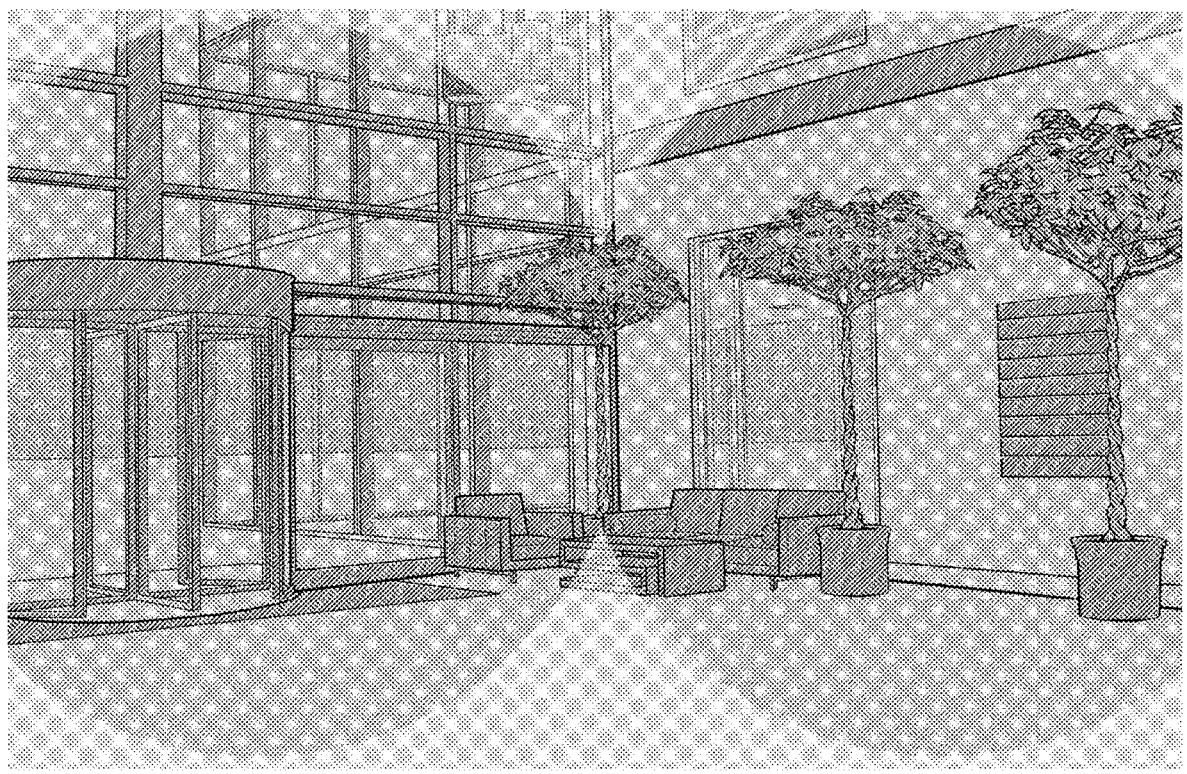
FIG. 15 shows a real estate simulation.

Turning to FIG. 12 one embodiment shows the System 100 operating on a Server Device and a plurality of Client Devices. Referring to the aforementioned real-estate use case, the real estate scenario or presentation is retrieved from the server devices 520 by the End-user Application Modules which are running on the augmented reality glasses 510, a virtual reality headset 511, a tablet 512 and a personal computer 513. The individuals may be in different locations as shown in FIG. 13 or a common as shown in FIG. 14. Regardless of the location, each end user sees the same scenario or presentation.

Figure 16:
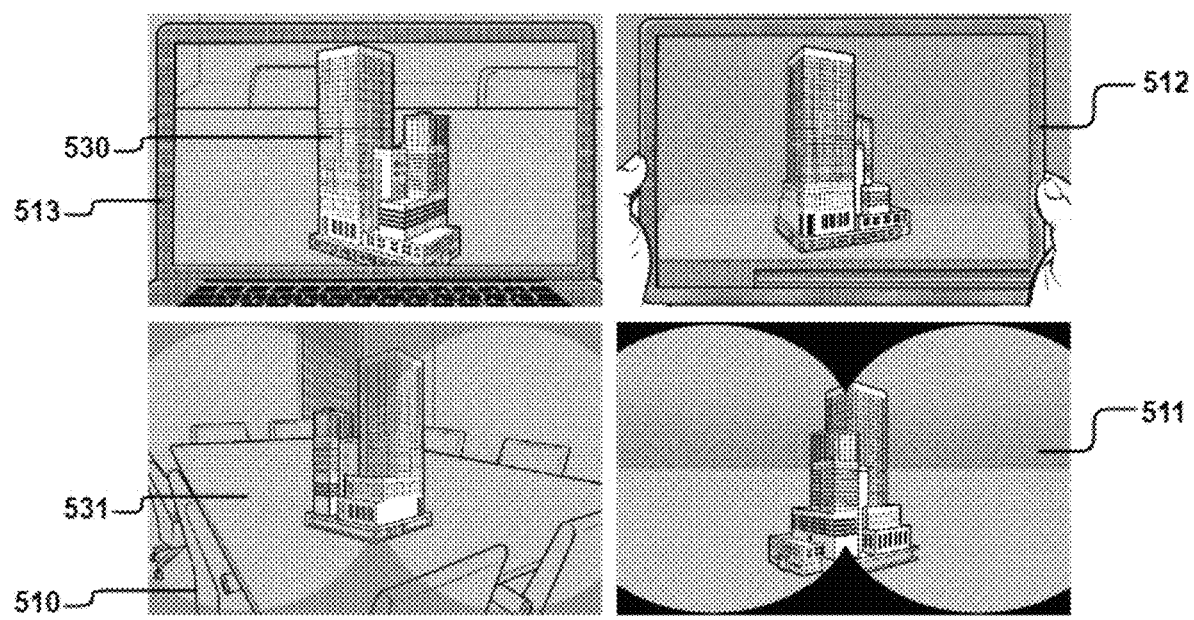
FIG. 16 shows the first person perspective of users with different devices in different locations after content is initialized.

Assume that the image is a hologram of a building 530 that is virtually projected onto a conference table 531. FIG. 16 shows how the presentation appears on the individual end user devices. The image on the personal computer 513 and the tablet 512 would include the table 531 overlaid with the image of the building 530. The image on the augmented reality glasses 510 would include the holographic image of the building 530 and the user would be able to see the physical table 531. The image seen on the virtual reality headset 511 does not include the table 531.

Figure 17:
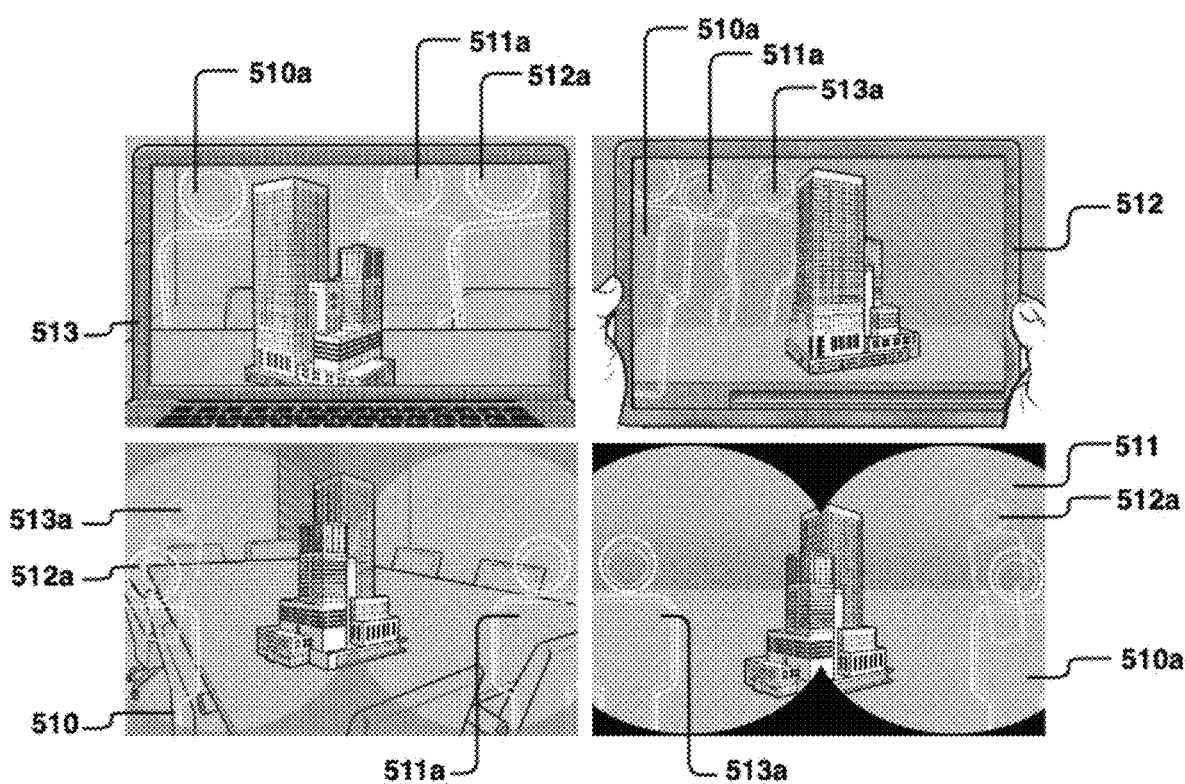
FIG. 17 shows the first person perspective of users with different devices in different locations after content is initialized and avatars representing each user are initialized.

In another embodiment avatars of the participants appear in the images. Turning to FIG. 17, avatars 510a, 511a, 512a, 513a represent images of the end users of the augmented reality device 510, the headset 511, and the tablet 512. The tablet user 512 has an image with avatars 510a, 511a and 513a of the other users. The images for augmented reality device 510, headset 511, personal computer device 513, and tablet 514 show avatars of the users of the other three devices.

Figure 18:
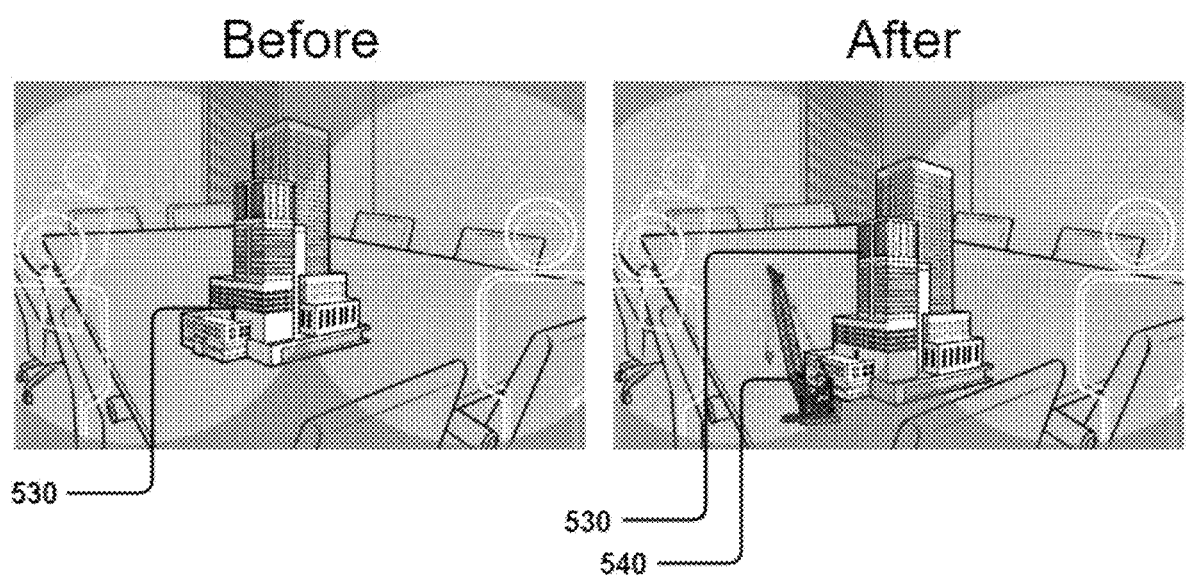
FIG. 18 shows the first person perspective of users with different devices in different locations after content is initialized and avatars representing each user are initialized, and new content (a crane) being added to accompany content presently in scene.

In one embodiment one of the users may add or remove an object to the scenario or presentation and the results of that action appear in the image for all the users. FIG. 18 shows a before and after comparison where a crane is added to the building of FIG. 16. Assume one of the end users requests a crane from an External Data Provider 108, the Simulation Content Repository 104, or authors a crane using the Simulation Content Authoring Module 103. The result is that all users now see a crane 540 next to the building 530. The new content of the crane 540 is added and synchronized among all users so all see the image of crane 540. If the crane 540 is removed by a user, the image returns to its original form as seen by all users. See FIG. 18 (Before).

Figure 19:
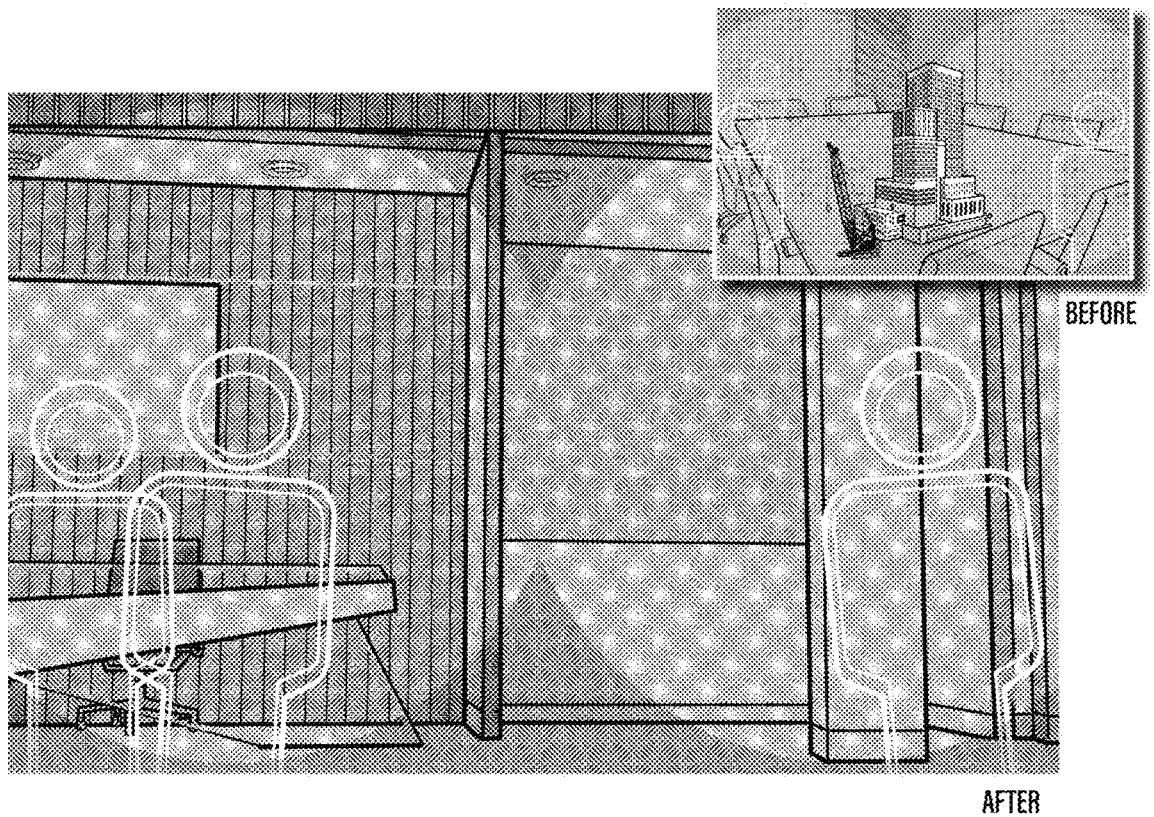
FIG. 19 shows the first person perspective of users with different devices in different locations after content is initialized and avatars representing each user are initialized, and shown here content is being removed and replaced by one user such that all users see the new content.

In one embodiment of the invention, users may simultaneously remove and replace the content being viewed among users. FIG. 19, shows a before and after comparison of this embodiment, whereby the aforementioned crane 540 and building 530 are simultaneously removed and replaced by a full-scale sized building. The new content of the full-scale building is added and synchronized among all users, so all see the visualization of the new building, see FIG. 19 (after), and all end-users no-longer see the aforementioned crane 540 and building 530, see FIG. 19 (before).

Figure 20:
FIG. 20 shows a military planning simulation.

Referring to FIG. 20, it illustrates a non-limiting exemplary use-case whereby the invention is used for Law Enforcement or Military Mission Planning and Situational Awareness. In this exemplary use-case, the invention allows the Operator to retrieve data from disparate sources—such as authoritative government databases, open-source databases, and real-time sensors—and visualize the data in AR using a Commercial Off the Shelf (COTS) head mounted display (HMD) mechanism, a tablet device, or a PC. This is achieved through the System's 100 modular, data agnostic open systems architecture, which allows it to support most methods of retrieving data (such as a RESTful API, UDP, TCP, PACKETS, and PROTOBUFS) and through a data visualization schema that supports the ingestion of most data formats (such as CSV, JSON, and XML). The system 100 architecture supports the visualization of i) real-time data, such as the position of hostile/blue-force/neutral assets and weather conditions, ii) non-real-time data, such as anticipated mission plans, terrain, locations of minefields or the known pattern of life, and iii) metadata, such as the time the data was captured or its source. The display mechanism used in the current prototype is the Magic Leap Augmented Reality HMD. However, the system has been designed to be device agnostic so that it can also be used with the Microsoft Hololens or future devices (such as the USARMY IVAS). With the current HMD, the Operator can easily add/remove sources and data using either their hands or a controller through a visually appealing, natural human computer interface. The interface design for the End-user Application Module 101 takes into consideration the human factors associated with operating in high-stress/fast-paced environments and can be configured based on the Operator's preferences. The operator can also add data to the system for others to see, such as new targets, messages, or waypoints. The data is presented to the Operator in a format that is natural, realistic, and adheres to MIL-STD-2525C standards, which allows the Operator to quickly orientate themselves with the data.

Referring to the non-limiting exemplary use-case whereby the invention is used for Law Enforcement or Military Mission Planning and Situational Awareness, in addition to the Data Visualization feature, the System 100 helps the Operator make sense of data quickly by performing analytics on the data and showing the results to the Operator as a layer on the same easy to interpret, holographic 3D interface which they see and interact with through the End-user Application Module 101. The Analytics serve as a force multiplier uncovering attributes about the adversary and environment that might otherwise have gone undetected. The analytics include: i) descriptive analytics, such as the number of recent EKIAs or KIAs in an area, ii) predictive analytics, such as potential enemy sniper locations or IEDs, and iii) prescriptive analytics such as potentially viable routes to avoid visual detection. These analytical models can be ingested from disparate sources, such as current government or COTS sources. This allows the system to be rapidly extended to support new use cases and enable scalability.

Figure 21:
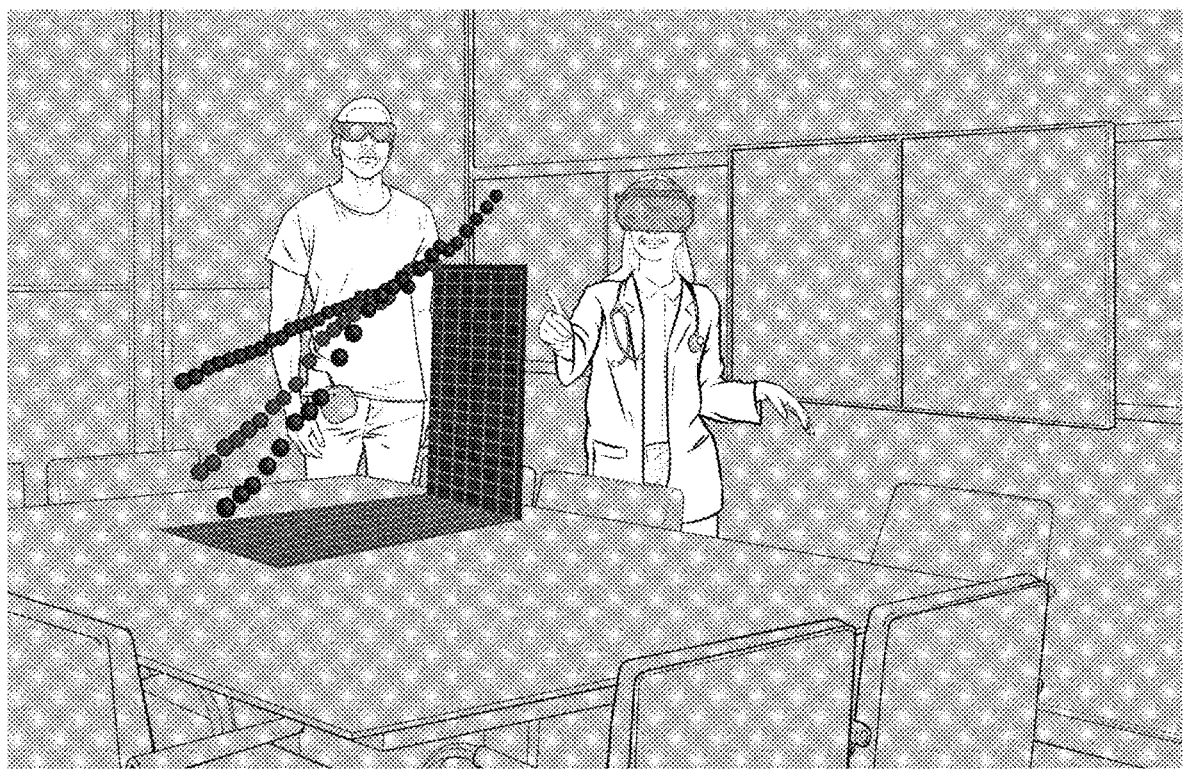
FIG. 21 shows a healthcare simulation.

Referring to FIG. 21, it illustrates a non-limiting exemplary use-case whereby the invention is used for healthcare patient and provider remote interaction, a user may create a virtual image of a patient with one or more views of the patient's bodily function or structure under review, such as the activity of muscles or organs. In a knee or hip replacement study, the image would show a representation of the current state of the knee or hip as rendered using MRI and x-ray data. The data could also show the patient's past and predicted medical history such as heart rate, blood pressure, number of hospitalizations or likelihood of mortality, as shown in FIG. 21.

Turning to FIG. 22, it illustrates a non-limiting exemplary use-case whereby the invention is used for training Military and Law Enforcement Personnel. The embodiments for training allow users to exercise cognitive skills, rapid decision making, and target acquisition in a stressful environment, including the introduction or removal of auditory commands, non-lethal, and lethal capabilities as fielded to military and police personnel. For example, some of the training topics include use-of force decisioning, marksmanship, joint-fires, and close quarter combat.

Referring to the non-limiting exemplary use-case whereby the invention is used for training Military and Law Enforcement Personnel, System 100 reveals positive and negative indicators of the user's actions. Positive indicators include target elimination, flow of targeting information throughout the chain of command, and effective use of both lethal and non-lethal attack means. Negative indicators include friendly fire incidents, collateral damage, and civilian casualties. Embodiments of the System 100 are capable of supporting a large number of users and simultaneous sessions through a scalable server architecture and a modular architecture that allows many instances of the software to run across compute resources.

Referring to the non-limiting exemplary use-case whereby the invention is used for training Military and Law Enforcement Personnel, using System 100 and the System Program 250, a user or multiple users in the same or different locations may display objects for a military or law enforcement training simulation, such as to train use of force decisioning skills or marksmanship. The objects and data may include renderings of stored or ingested data to show terrain, buildings, roads, weather, weapons, vehicles, aircraft, ships, and placement of hostile and friendly forces.

Referring to the non-limiting exemplary use-case whereby the invention is used for training Military and Law Enforcement Personnel, computer controlled avatars are a key asset in our simulations. Computer controlled avatars respond to physical and verbal actions performed by the user through the combination of our input system that detects events (including audible and physical actions being performed by the user) and adjustable logic gates that initialize avatar animations according to events. The avatars respond to the presence of the users automatically using a technique referred to as ray casting. Using ray casting, the avatar casts a virtual line to the user to check if there are any walls or large objects between them. If there are no walls impeding the ray cast, the adversary is triggered to respond to the user's presence and react in various pre-configured or random ways such as running away or toward the user. The realism and volume of our simulation content transfers training to the real world.

Referring to the non-limiting exemplary use-case whereby the invention is used for training Military and Law Enforcement Personnel, content, in the form of 3D assets are pulled from the Content Repository 104 when needed and configured to look and perform according to configuration files and user settings at runtime using external data, configuration files, and user interfaces. For example, consider a rain asset in a simulation comprising of weather, adversaries, and terrain (i.e. ingredients). The rain asset is configured with a float variable for intensity (1-10), which may be set at design-time (according to the simulation's author), run-time (according to the trainer or trainee), or real-time (according to data from a live weather database). Likewise, the adversary assets are configured with an intensity variable that defines their performance against the trainees. This approach is applied to all assets in our simulations to reduce the storage and bandwidth required and aligns with our modular design.

Referring to the non-limiting exemplary use-case whereby the invention is used for training Military and Law Enforcement Personnel, the position, configuration, and status of each asset in the simulation (including trainees) is shared among users on the Multi-user Networking Module 106 with a lean vector graphic approach that allows for objects to be controlled in real-time by external data, user input, and physics calculations. This method provides a multi-user experience that overcomes the usual bandwidth challenges associated with massive multi-user simulations Referring to the non-limiting exemplary use-case whereby the invention is used for training Military and Law Enforcement Personnel, in operation, the System 100 provides a rapid scenario generation capability that includes a number of objects often found in a real-world conflict, including and not limited to unarmed civilians, internally displaced persons, and neutral parties. Each avatar or participant has a range of postures (friendly, indifferent, neutral, or enemy). Other assets include different organizations and equipage (militias with little or no equipment, well equipped organized units, partially armored, and fully armored near peer entities) to facilitate a range of combat conditions that a trainee needs to know how and where to engage targets for the desired effect.

Referring to the non-limiting exemplary use-case whereby the invention is used for training Military and Law Enforcement Personnel, in one embodiment the System 100 has the ability to assess weapons effect on targets, allows creation of virtual obstacles and terrain features, and provides realistic levels of cover and protection. Other features include realistic OE visualization and audio virtual cues, including air, land (dense urban terrain), coastal areas, and cities in the vicinity of littoral areas. Further features include physical/virtual movement to execute individual and squad tasks and battle drills to replicate demands of close combat.

Referring to the non-limiting exemplary use-case whereby the invention is used for training Military and Law Enforcement Personnel, a scenario can be generated with an End-user Application 101 or a 3rd Party Software Application 110 by any user with basic computer skills. The System 100 allows and accommodates physical and virtual movement to execute individual operations and operations of collective squads. In one embodiment the System 100 incorporates maneuver and fire effects. It also allows users to modify scenario conditions and reset the training event within a short period of time.

Referring to the non-limiting exemplary use-case whereby the invention is used for training Military and Law Enforcement Personnel, embodiments of the System 100 are capable of providing the positions of trainees in the simulations and showing the results of a trainee using binoculars and communication equipment, operations during day or night, and environmental effects such as wind, rain, snow, and hail, moving and stationary firing capability against both moving and stationary targets, replication of munition fragmentation effects and characteristics and known surface-danger zones, surrogate weapons that have the same form, fit, and function as the real weapon with functional characteristics of the actual weapon system (recoil) and performance (e.g. bolt open on last round, eight cycles of function, etc.).

Referring to the non-limiting exemplary use-case whereby the invention is used for training Military and Law Enforcement Personnel, some embodiments of the System 100 provide untethered rifle and pistol capability with a qualification table for zeroing course of fire, training of combat marksmanship in a course of fire that includes short range targets in an urban setting with friendly, neutral, and hostile targets. Combat marksmanship capability allows users to move freely (untethered) at a walk, run, crawl, kneel, and assume a prone position for unhindered lateral and forward/rearward movement and turning during all training, including the ability for users or avatars to give hand and arm signals such as halt, freeze, and assemble.

Referring to the non-limiting exemplary use-case whereby the invention is used for training Military and Law Enforcement Personnel, the System 100 may provide a training simulation to train target determinations and effect applications that replicates the environment with unarmed civilians, internally displaced persons, neutral parties to include non-governmental operators (NGOs), militias with little or no equipment, or other organized units indifferent to friendly and enemy mission or cause, partially armored combatant and fully armored threats (friendly, neutral, or enemy). Such training simulations replicate a multi-domain battlefield including air, land (dense urban terrain), and coastal areas and cities in the vicinity of littoral areas with obstacles and terrain features that provide realistic levels of cover and protection.

Referring to the non-limiting exemplary use-case whereby the invention is used for training Military and Law Enforcement Personnel, embodiments of the invention support individual and collective training. Embodiments are built on an open architecture and use design-time and run-time translators coupled with an agnostic content repository and broker that allows it to ingest simulation content from multiple cloud or on-premise sources. Designed to be data and device agnostic, the System 100 allows Simulation content to be created in a variety of 3rd Party Software Applications 110 and tools, including the Unity game engine. The Simulation Content Repository 104 and External Data Providers 108 may include three-dimensional objects, data, and scripts that control how objects look and respond to interaction as well as simulation setup. This approach is aimed at providing the flexibility needed to integrate different scenarios into the System 100 without the need to modify the architecture, hardware, application layer, or source code. The embodiments of System 100 are able to ingest content from the Simulation Content Repository 104 and External Data Providers 108. The System 100 accepts simulation content to be ingested using design-time and run-time translators to convert the content into a format that can be ingested and used by all end user applications 101.

System Flow Chart

Figure 23:
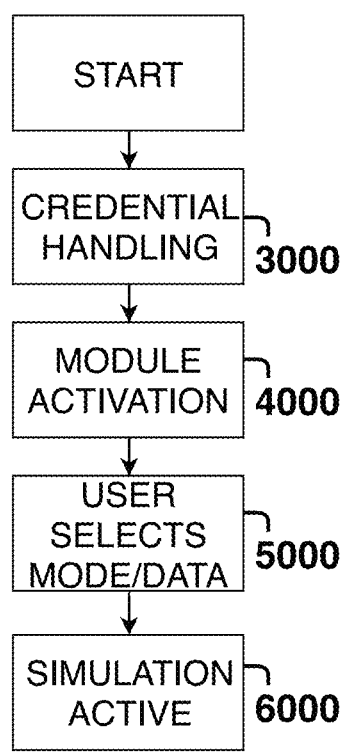
FIG. 23 is a high level flowchart of system Program 250.

FIG. 23 shows a high level logical flow chart of the system Program algorithm 250. The Program 250 begins by running the startup process 2000. After startup, the Program 250 runs a Credential Handling process 3000. After the user's credentials are accepted, the Program 250 begins running the Module Activation Process 4000. After the modules are activated, the user selects the mode and data 5000 for the simulation. And upon completion, the Program 250 activates the simulation in steps 6000. Those skilled in the art know that the steps shown in the figures for the flow chart may be executed by one or more programs distributed among the modules of the system 100. Portions of the steps shown in FIGS. 23-36 may reside in the modules or the server. It is well known that in modular systems software is distributed among the modules to enable the system to perform its intended functions.

Figure 24:
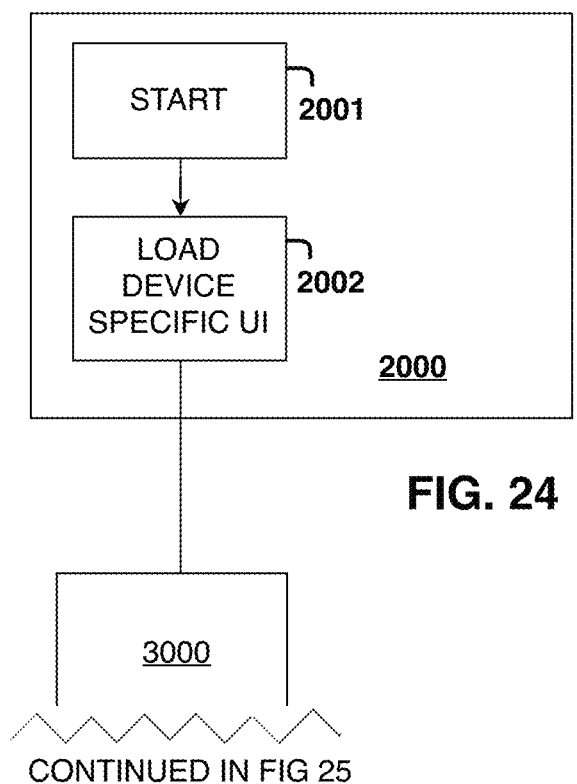
FIG. 24 is a flowchart of startup steps.

FIG. 24 shows the startup process steps 2000. As shown, after startup, the application layer loads a user interface 2002, which is designed and developed specifically for each user device. For example, a user using an Augmented Reality device has a user interface loaded by their application which is designed and developed specifically for Augmented Reality. Alternatively, a user using a PC has a user interface loaded by their application which is designed and developed specifically for the PC. These user interfaces may exist locally in the user's End-user Application Module 101, or a plurality of the design assets and functions may exist in either the Content Repository Module 104 or in External Data Sources 108. Upon completion of the Load Device Specific User Interfaces Step 2002, the Program 250 advances to the Credential Handling Process Steps 3000.

Figure 25:
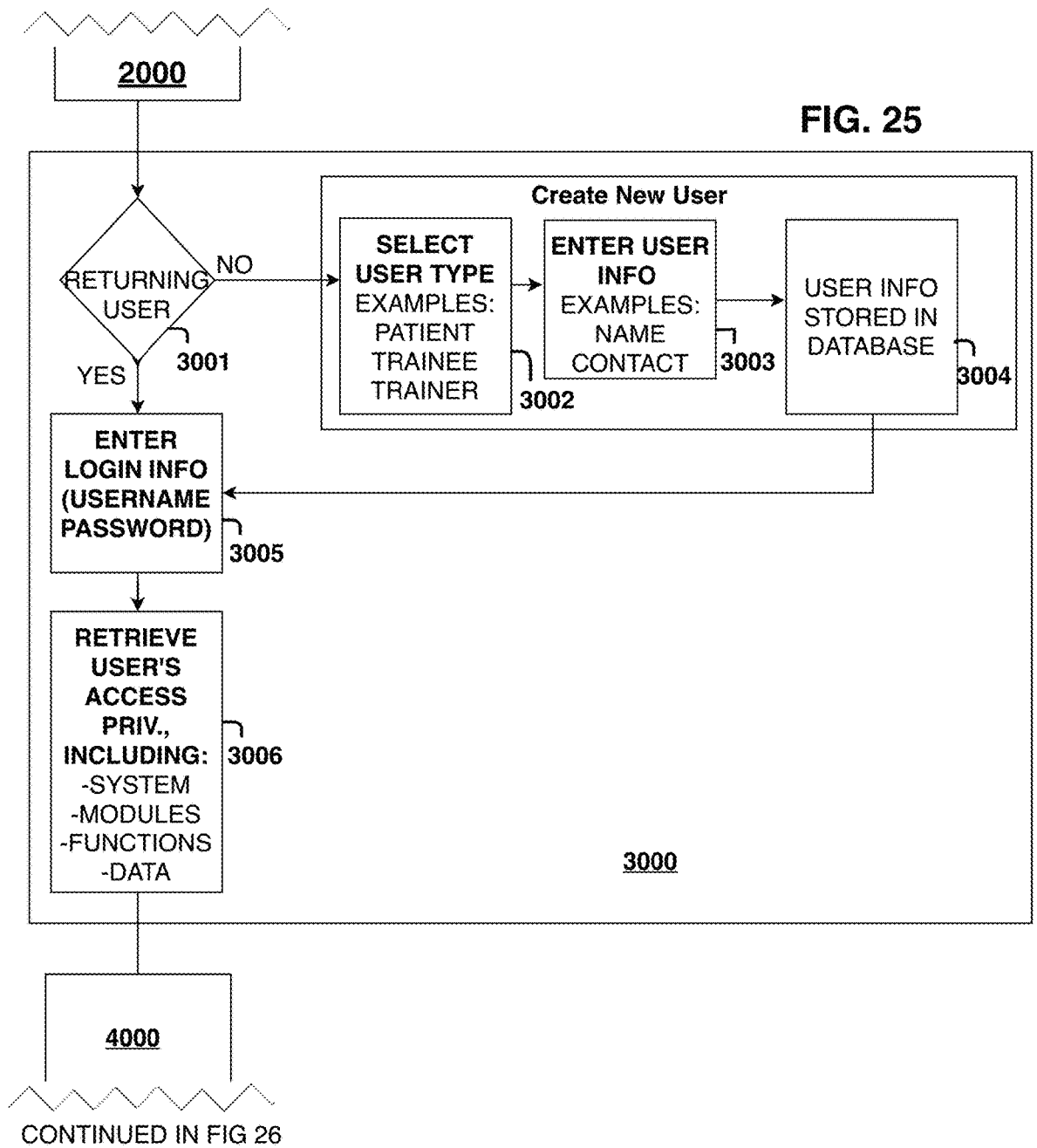
FIG. 25 is a flowchart of credential handling steps.

FIG. 25 shows the Credential Handling Process Steps 3000. As shown, step 3001 determines if the user is a returning user. The Program 250 accomplishes this by prompting the user to input whether or not they are a new user; or, in another embodiment, the Program 250 automatically determines that information using the IP Address, Device, and/or login credentials stored on a list of prior users. If the user is not a returning user, the Program 250 begins the process to create a new user 3002, 3003, and 3004, wherein the first step the Program 250 performs is to prompt the user to select the type of user they want to create 3002, such as a researcher, a patient, a soldier, or a scientist. Depending on the implementation, these types of users will be customized and may contain any of a number of different types of users such as a soldier, an officer, or a trainer. Next, the Program 250 prompts the user to enter their first and last name, and any additional information the Program 250 has been configured to request and store, such as the user's address or an employee identifier. Then the Program 250 stores the user's new information into a secure and encrypted user database, step 3004. Depending on the deployment and system configuration, the database may be located either locally on premise or on a cloud resource. Alternatively, at step 3001, if the user is a returning user, the user is prompted to input their username and password 3005. After logging into the System 100, the Program 250 retrieves the User's Access Privileges, step 3006. These privileges define the user's capacity to use the System 100 as it relates to create, read, update, delete, and configure the data, functions, and system modules which may comprise System 100. After the User's Access Privileges are retrieved, the Program 250 moves onto steps 4000.

Figure 26:
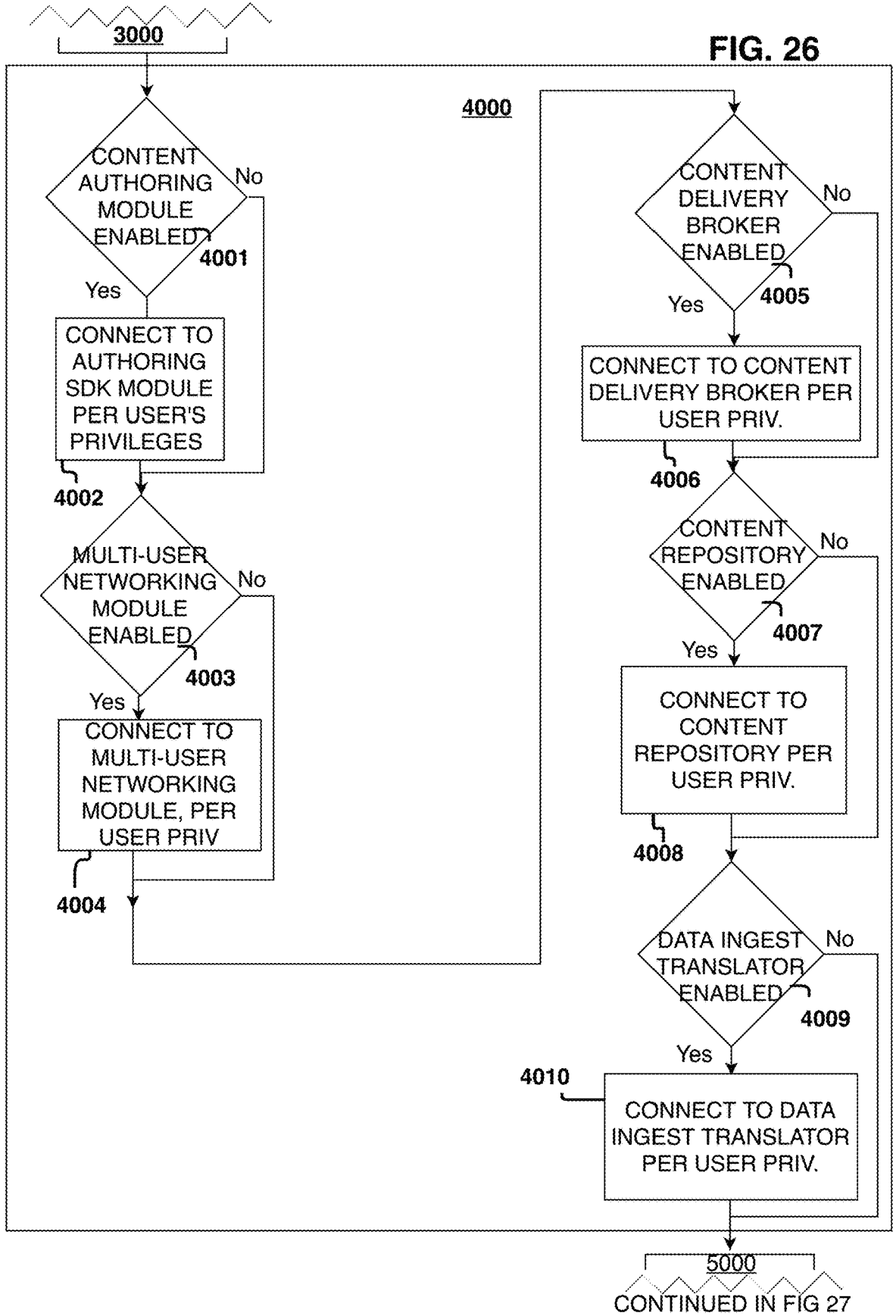
FIG. 26 is a flow chart of module activation steps.

FIG. 26 shows steps 4000 in more detail. The Program 250 checks to see whether each component of the System 100 is enabled. The term enabled is used to mean that (i) the System 100 was deployed with this component (i.e. the client purchased that component), (ii) the user has access privileges to use that component, (iii) the System 100 is able to connect to that component via the methods discussed previously, (iv) the user has selected the option to use that module during the Startup Step 4000. For example, here the Program 250 prompts the user to input various configuration options and then loads the simulation and data in accordance with these options. Step 4001 checks if the Simulation Content Authoring Module 103 is enabled, and, if so, the Program 250 advances to step 4002, in which it connects to the Simulation Content Authoring Module 103 per the user's privileges. If the Simulation Content Authoring Module 103 is not enabled at step 4001, the Program 250 ignores step 4002 and updates the system configuration variable to state that the Simulation Content Authoring Module 103 is not enabled. In both cases, the Program 250 advances to Step 4003, which checks if the Multi-user Networking Module 106 is enabled, and, if so, the Program 250 advances to step 4004, in which it connects to the Multi-user Networking Module 106 per the user's privileges. If the Multi-user Networking Module 106 is not enabled at step 4003, the Program 250 ignores step 4004 and updates the system configuration variable to state that the Multi-user Networking Module 106 is not enabled. In both cases, the Program 250 advances to Step 4005, which checks if the Content Delivery Broker Module 105 is enabled, and, if so, the Program 250 advances to step 4006, in which it connects to the Content Delivery Broker Module 105 per the user's privileges. If the Content Delivery Broker Module 105 is not enabled at step 4005, the Program 250 ignores step 4006 and updates the system configuration variable to state that the Multi-user Networking Module 106 is not enabled. In both cases, the Program 250 advances to Step 4007, which checks if the Content Repository Module 104 is enabled, and, if so, the Program 250 advances to step 4008, in which the Program 250 connects to the Content Repository Module 104 via the Content Delivery Broker Module 105 per the user's privileges. If the Content Repository Module 104 is not enabled at step 4007, the Program 250 ignores step 4008 and updates the system configuration variable to state that the Content Repository Module 104 is not enabled. In both cases, the Program 250 advances to Step 4009 which checks if the Data Ingest Translators Module 107 is enabled, and, if so, the Program 250 advances to step 4010, in which it connects to the Data Ingest Translators Module 107 via the Content Delivery Broker Module 105 per the user's privileges. If the Data Ingest Translator Module 107 is not enabled at step 4009, the Program 250 ignores step 4010 and updates the System 100 configuration variable to state that the Data Ingest Translators Module 107 is not enabled. In both cases, the Program 250 advances to Step 5000.

Figure 27:
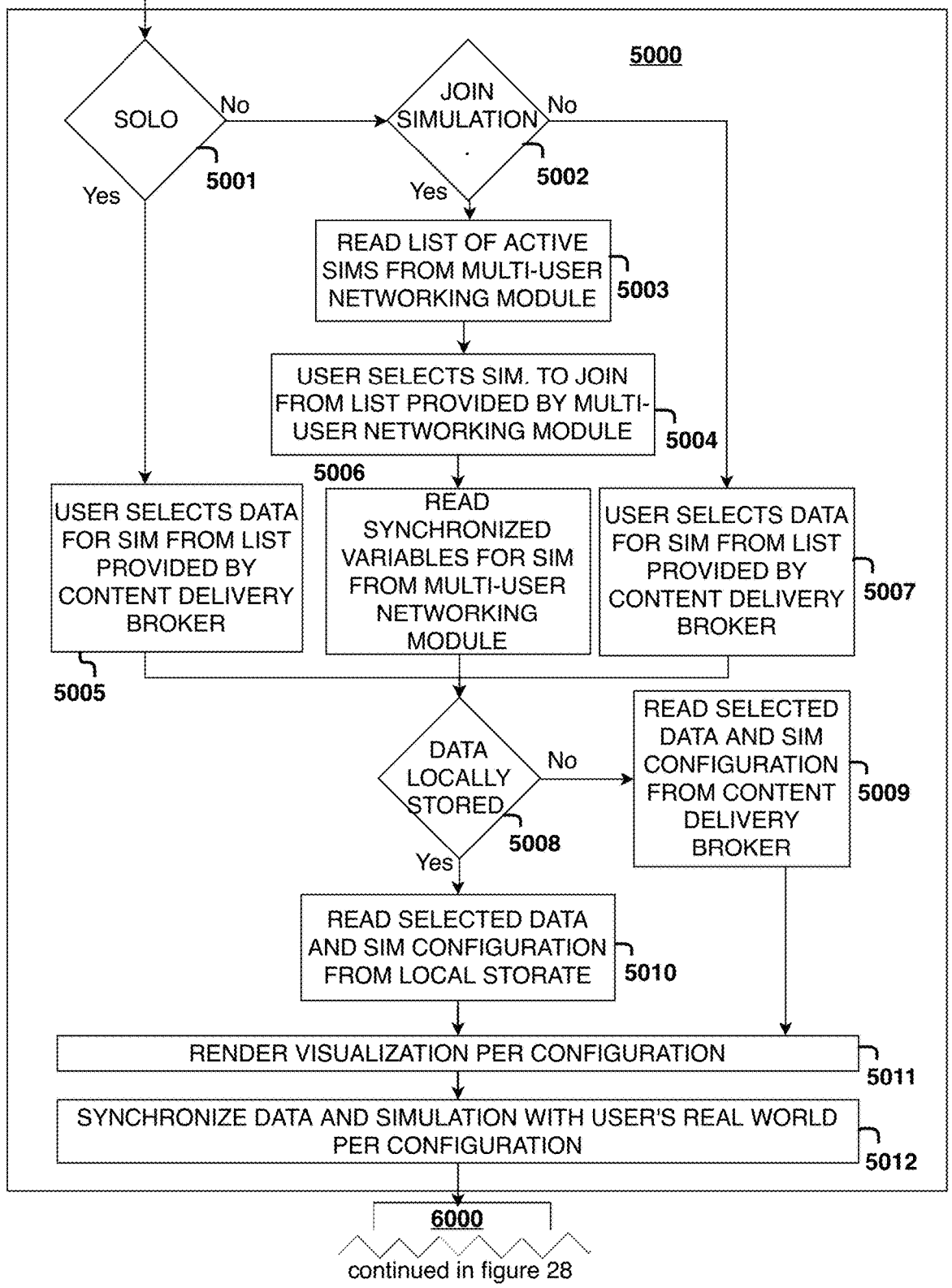
FIG. 27 is a flow chart of mode selection steps.

FIG. 27 shows steps 5000 in more detail. Step 5001 checks whether the user is intending to launch a Solo or Multi User simulation. If, at step 5001, the user selects Solo, the Program 250 retrieves a list of available data and simulations from the Content Delivery Broker Module 105 and allows the user to select the data or simulation they would like to load, step 5005. Alternatively, if, at step 5001, the user selects a multi user simulation, as opposed to solo, the Program 250 prompts the user to input whether they would like to join an active simulation or start a new one at step 5002. If, at step 5002 the user chooses to join a simulation, the Program 250 proceeds to step 5003, whereby the Program 250 reads a list of active simulations from the Multi-user Networking Module 106. Afterwards, the user is prompted at Step 5004 to select a simulation to join, and based on the selection made by the user, the Program 250 proceeds to step 5006 whereby it reads the synchronized variables for the simulation from the Multi-user Networking Module 106. Alternatively, if, at step 5002 the user chooses to NOT join a simulation, but rather start a new one on their own, the Program 250 proceeds to step 5007 where the user selects the data for the simulation from a list provided by the Content Delivery Broker Module 105. At this point, regardless of the user's selections (i.e. solo/multi-user, join/create new simulation), the Program 250 moves to step 5008 where the Program 250 checks to determine if the data the user has selected exists in local storage. If the data exists in local storage, at step 5008, the Program 250 proceeds to step 5010 where the Program 250 reads the selected data and simulation configuration from local storage. If the data does NOT exist in local storage, at step 5008, the Program 250 proceeds to step 5009, in which the Program 250 reads the selected data and simulation configuration from the Content Delivery Broker Module 105. After steps 5009 or 5010, the Program 250 moves to step 5011, whereby the Program 250 renders the visualization per the configuration established in the prior steps. Next, the Program 250 moves to step 5012 whereby the System 100 synchronizes the position of the visualization with the User's Actual Environment per the configuration set by the user in the prior steps or during this step. For example, if the user wants to move the virtual environment onto a table in their room, as shown in FIG. 16, step 5012 is where that occurs. In another embodiment, the virtual environment is configured to be automatically placed at the location of a visual target such as an image on a piece of paper. The image is detected by a sensor (such as a camera) that is part of the head mounted display which serves as the computer for the End-user Application Module in this configuration. After step 5012, the Program 250 advances to step 6000.

Figure 28:
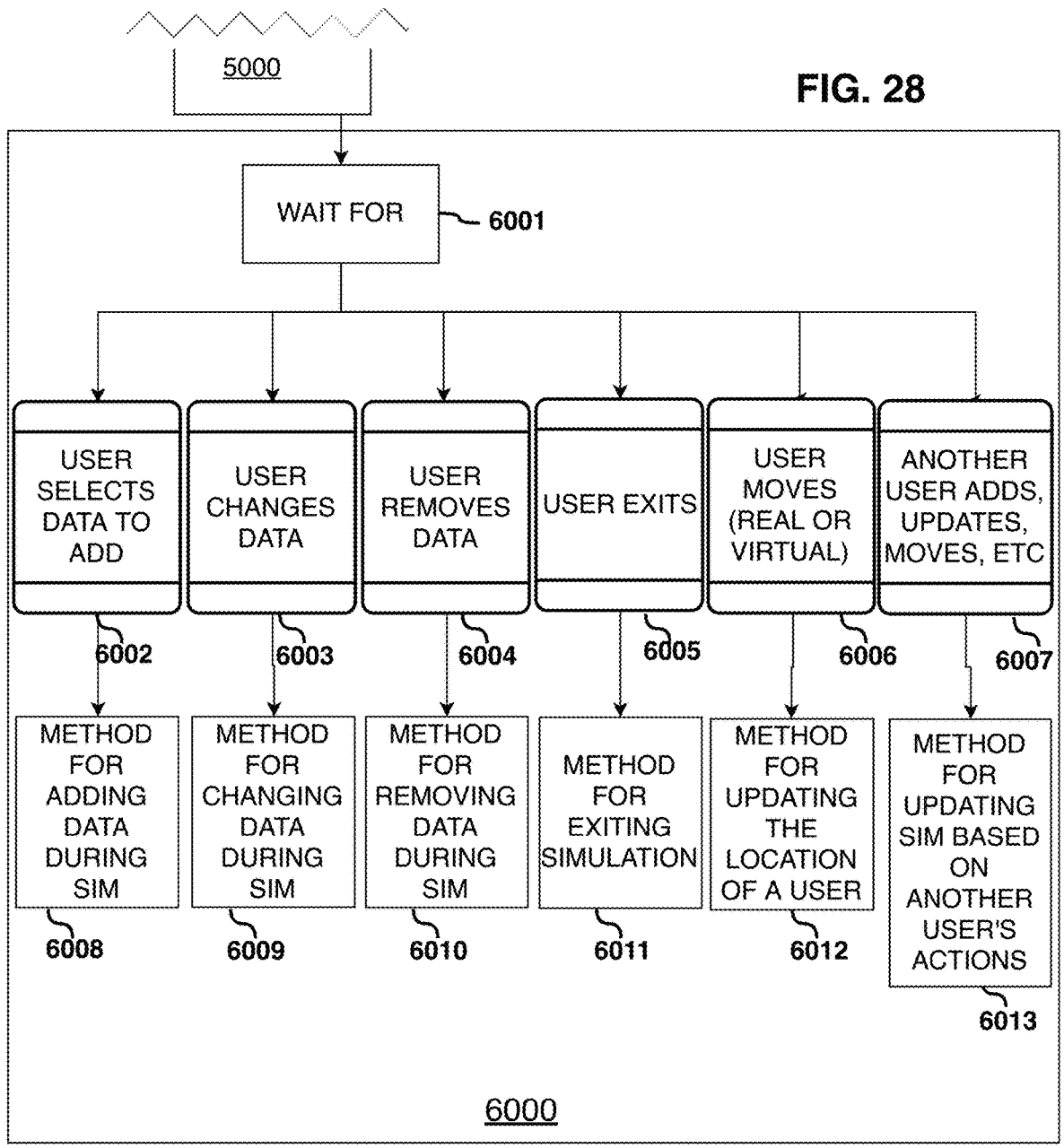
FIGS. 28-34 show a flow chart of simulation actuation steps.

FIG. 28 shows step 6000 in more detail. At this point the System 100 is up and running. At step 6001, the Program 250 waits for one of a plurality of events (6002, 6003, 6004, 6005, 6006, or 6007). Upon detecting one of these events, the Program 250 advances to the next step (6008, 6009, 6010, 6011, 6012, or 6013).

Figure 29:
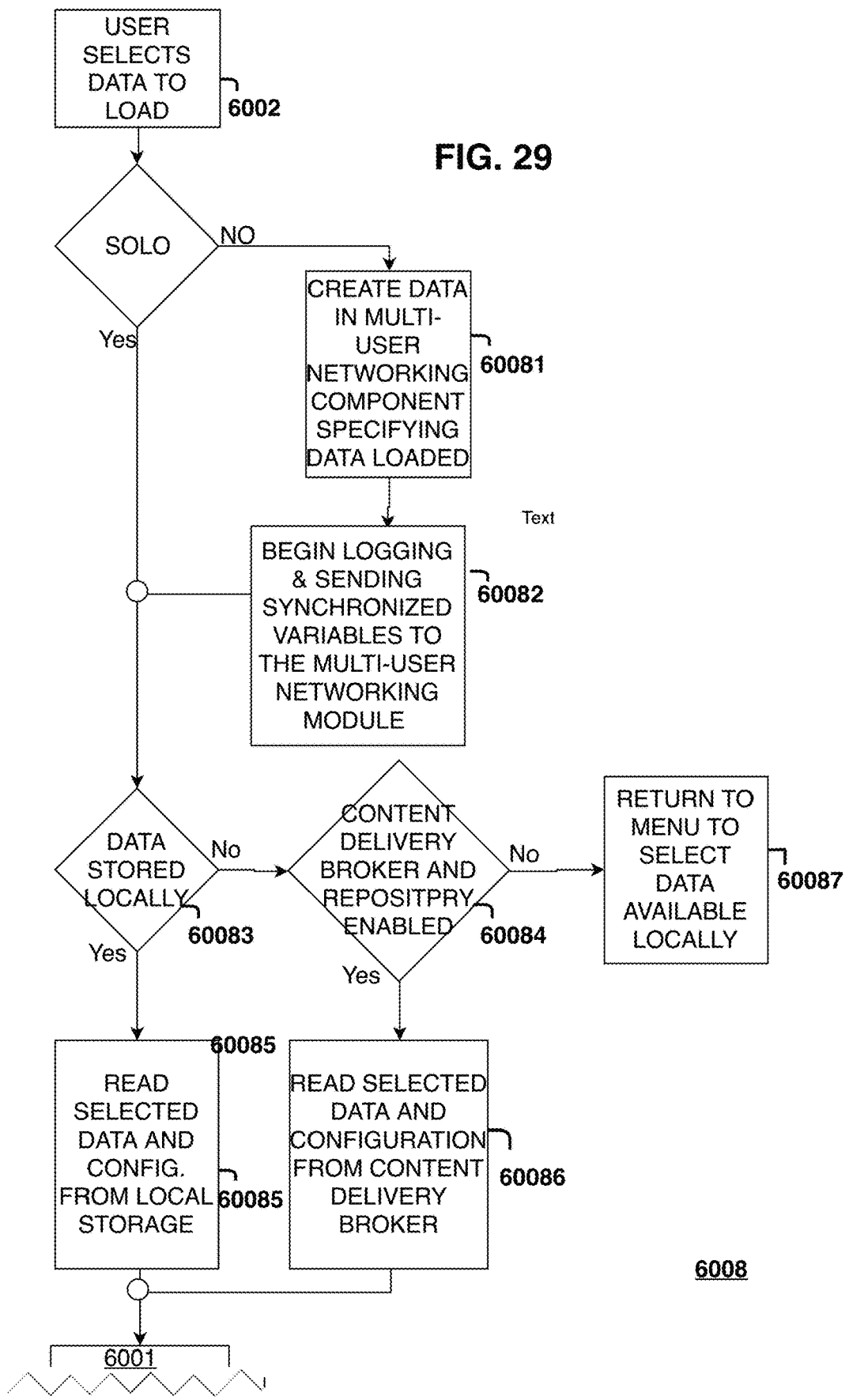

FIG. 29 shows step 6008 in more detail. As shown, in step 60081 the user selects the data they would like to add. The list of available data is provided by the same process enumerated in FIG. 27. After the user selects the data at step 60081, the Program 250 advances to step 60082, which determines if the simulation is a solo or a multi-user simulation. It should be noted that even if the user is solo (on their own) currently but has previously selected to create a multi-user simulation at step 5001, step 60082 shall determine that the user is in a multi-user simulation. If, however, the user is presently solo (not in multi-user mode), as set at step 5001, the Program 250 will advance to step 60083, which creates data in the multi-user networking component database specifying the data added to the simulation. For example, if the user has added data to the simulation which comprises a building as shown in FIG. 16, the Program 250 creates data in the Multi-user Networking Module 106 database specifying that the building is active in the simulation. The Program 250 advances to step 60084, which begins logging synchronized variables for the data (such as its relative position in the virtual environment) and sending that data to the multi-user networking component. The Program 250 then advances to step 60085, which checks if the data exists in local storage. If the data does not exist in local storage at step 60085, the Program 250 advances to step 60088 which reads the selected data and simulation configuration from local storage. Alternatively, at step 60085, if the Program 250 detects that the data does not exist in local storage, the Program 250 advances to step 60086, which checks if the Content Delivery Broker Module 105 and the Content Repository Module 104 are both enabled, and if so the Program 250 advances to step 60089 which reads the selected data and simulation configuration from the Content Delivery Broker Module 105. Alternatively, at step 60086, if the Program 250 detects that the Content Delivery Broker Module 105 and the content repository are not enabled, the Program 250 advances to step 60087, which returns the user to the menu to select different data that is available in local storage. After steps 60088 and 60089, the Program 250 returns to step 6001.

Figure 30:
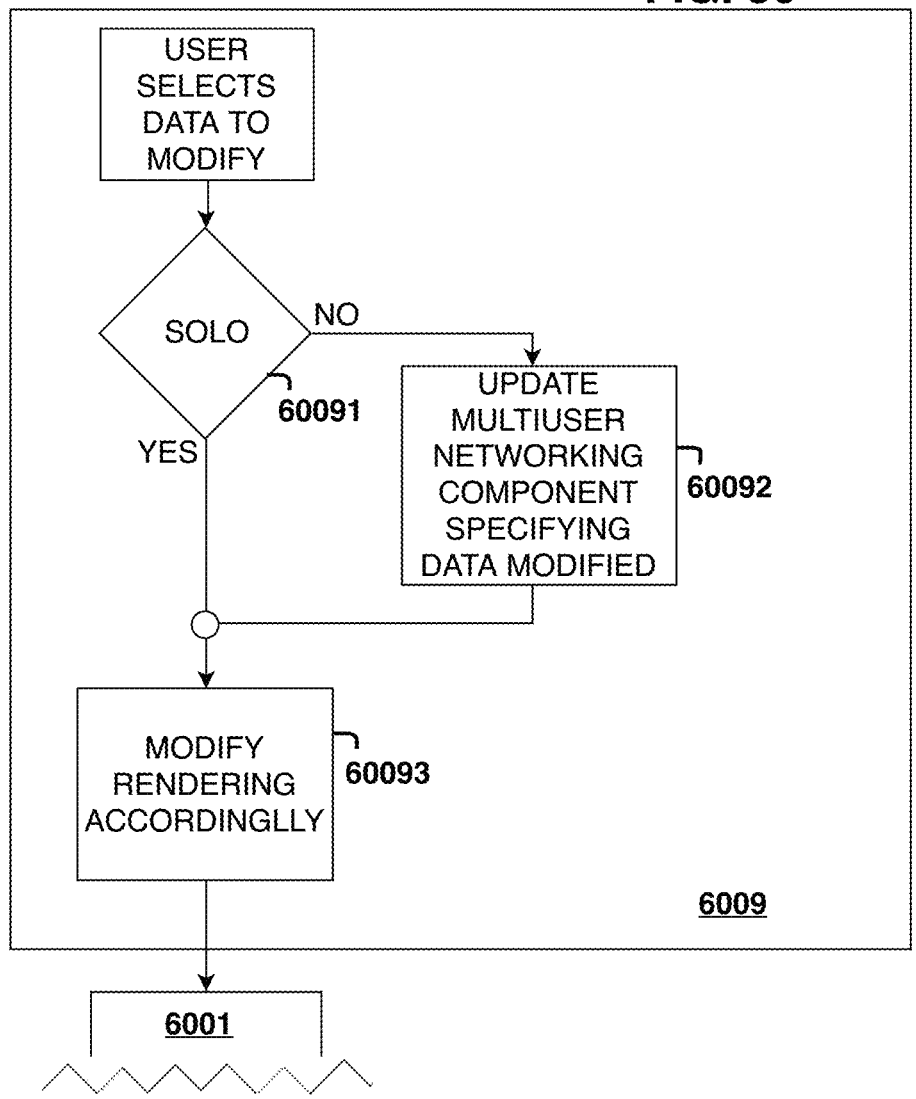

FIG. 30 shows step 6009 in more detail. As shown, at step 60091, the Program 250 prompts the user to select the data to modify. For example, the user may move the data from one location to another or change the range of the data being viewed (such as the minimum and maximum). After step 60091, the Program 250 advances to step 60092, which determines if the user is operating in solo or multiplayer mode. If, at step 60092, the Program 250 is operating in solo mode, the Program 250 advances to step 60094, which modifies the rendering of the data and/or calculates any changes to the data according to the input provided at step 60091. For example, if the user has modified the minimum and maximum values for the data being viewed, the rendering process at step 60094 ignores data outside of the new range. In another example, if the user has moved the data to a new position in their space, the rendering at step 60094 begins rendering the data visualization in the new location set by the user at step 60091. Alternatively, if, at step 60092, the Program 250 detects that the user is operating the Program 250 in multi-user mode, the Program 250 advances to step 60093, which updates the Multi-user Networking Module 106 database specifying the data modification. For example, if the data was moved to a new coordinate, the updated coordinate is sent to the Multi-user Networking Module 106 and stored in the database. Or, if the range was changed, the updated minimum and maximum values are sent to the multi-user networking component and stored in its database. The Program 250 then advances to step 60094, which was described previously in this paragraph. The Program 250 then returns to step 6001.

Figure 31:
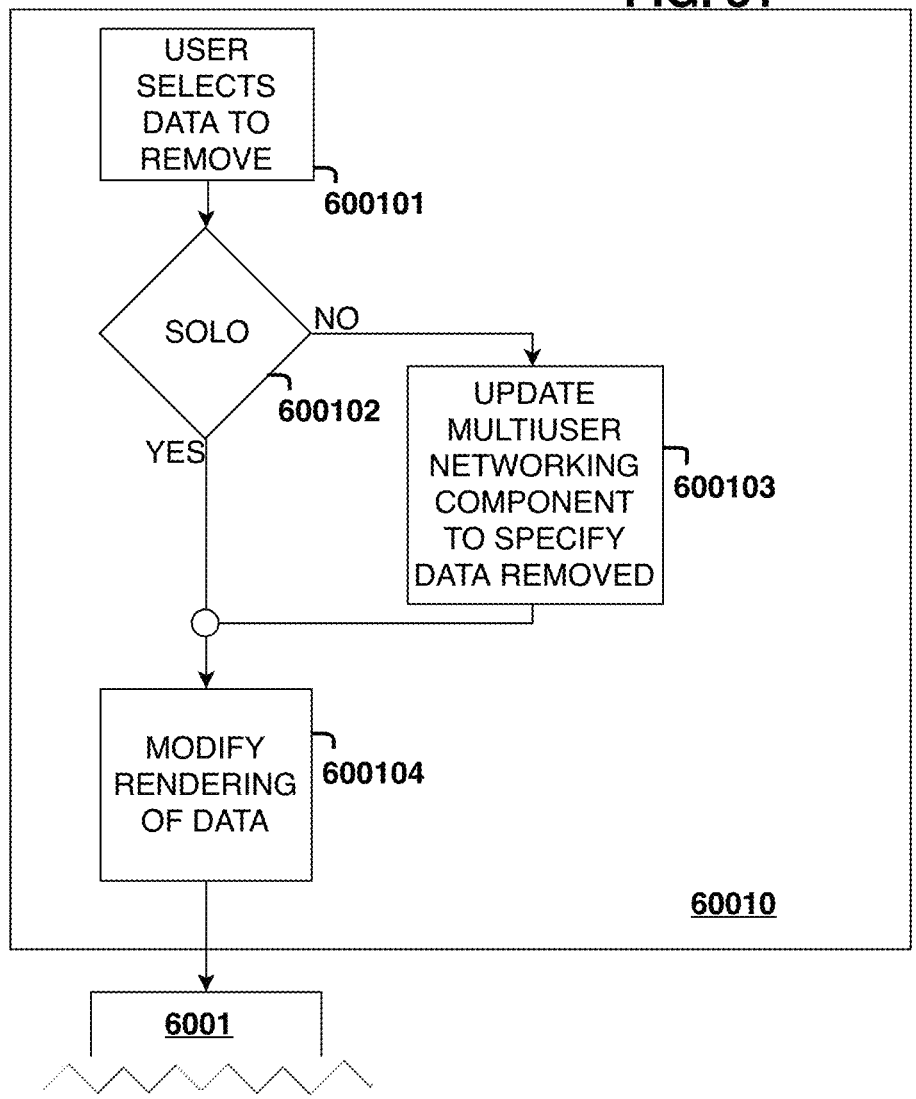

FIG. 31 shows step 60010 in more detail. As shown, at step 600101, the Program 250 prompts the user to select the data to remove. For example, the user may remove an object such as a vehicle or a building. After step 600101, the Program 250 advances to step 600102, which determines if the user is operating in solo or multiplayer mode. If, at step 600102, the Program 250 is operating in solo mode, the Program 250 advances to step 600104, which modifies the rendering of the data and/or calculates any changes to the data according to the input to remove data provided at step 60091. For example, if the user has removed a building or a vehicle, the rendering process at step 60094 removes the data from the visualization. Alternatively, if, at step 600102, the Program 250 detects that the user is operating the Program 250 in multi-user mode, the Program 250 advances to step 600103, which updates the Multi-user Networking Module 106 database specifying the data removed. For example, if the aforementioned building or vehicle data was removed, that removal information is sent to the Multi-user Networking Module 106, which removes that object from the database of active data objects. The Program 250 then advances to step 600104, which was described previously. The Program 250 then returns to step 6001.

Figure 32:
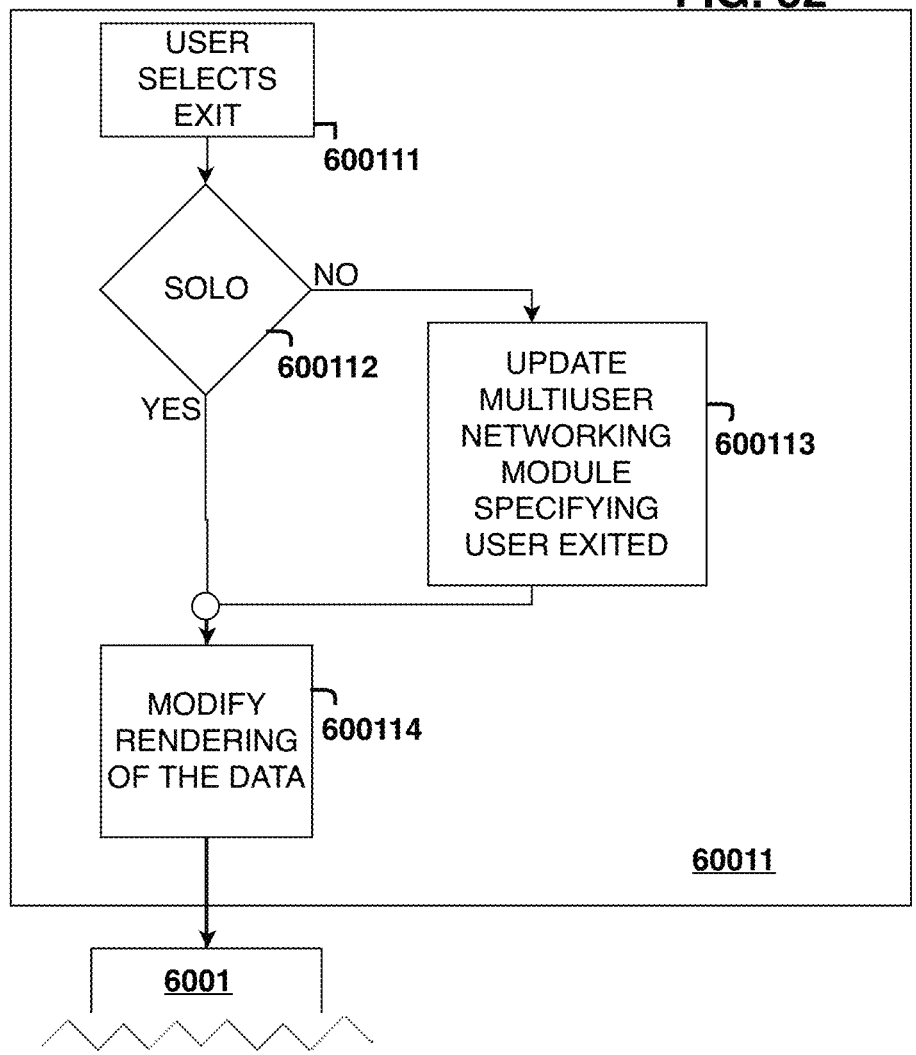

FIG. 32 shows step 60011 in more detail. As shown, at step 600111, the Program 250 provides the user with the ability to exit the simulation using a user interface. After step 600111, the Program 250 advances to step 600112, which determines if the user is operating in solo or multiplayer mode. If, at step 600112, the Program 250 is operating in solo mode, the Program 250 advances to step 600114 and closes the application. Alternatively, if, at step 600112, the Program 250 detects that the user is operating the Program 250 in multi-user mode, the Program 250 advances to step 600113, which updates the Multi-user Networking Module 106 database specifying the user has exited and is no longer active. The Program 250 then advances to step 600114, which was described previously in this paragraph. The Program 250 then returns to step 6001.

Figure 33:
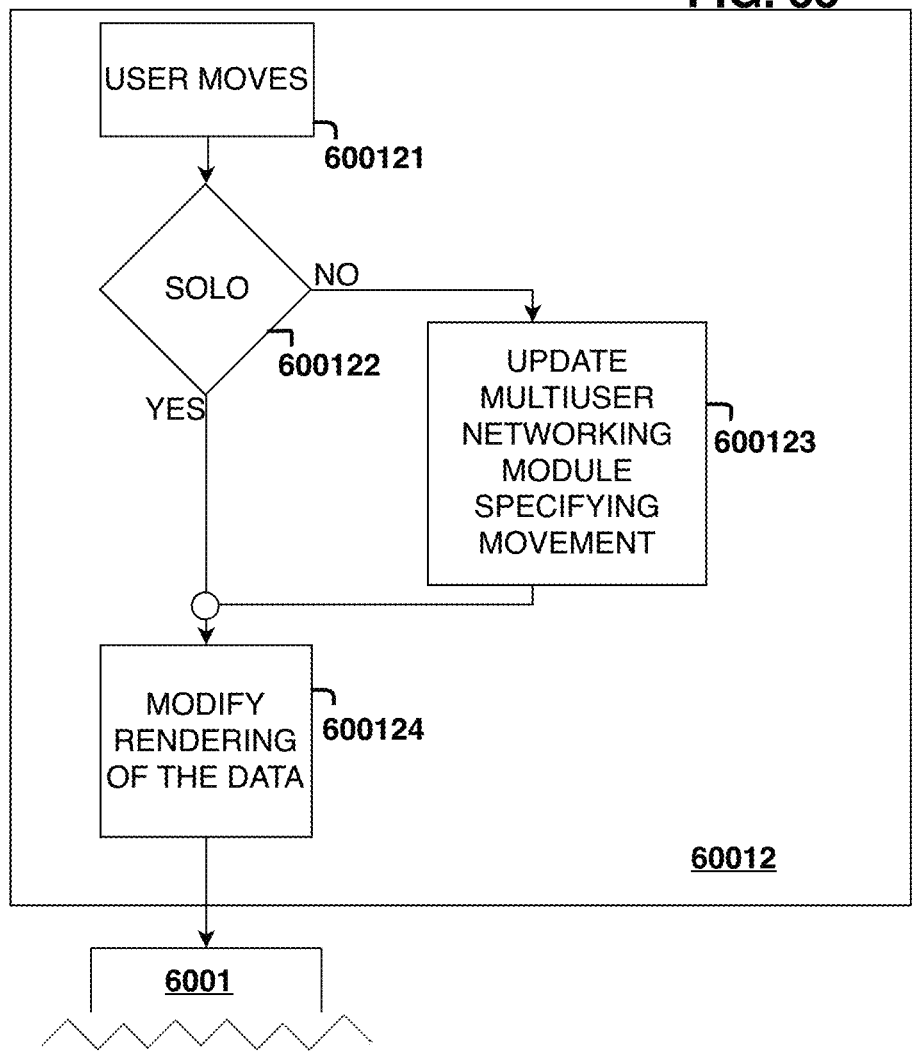

FIG. 33 shows step 60012 in more detail. As shown, at step 600121, the Program 250 detects that the user has moved. Moved can mean physical movement, such as the user turning their head or walking, or virtual movement, such as pressing a button on a screen that moves the user in the virtual world. After step 600121, the Program 250 advances to step 600122, which determines if the user is operating in solo or multiplayer mode. If, at step 600122, the Program 250 is operating in solo mode, the Program 250 advances to step 600124 and modifies the rendering of the data to account for the user's new position. Alternatively, if, at step 600112, the Program 250 detects that the user is operating the Program 250 in multi-user mode, the Program 250 advances to step 600123, which updates the Multi-user Networking Module 106 database specifying the user's new position. The Program 250 then advances to step 600124, which was described previously in this paragraph. The Program 250 then returns to step 6001.

Figure 34:
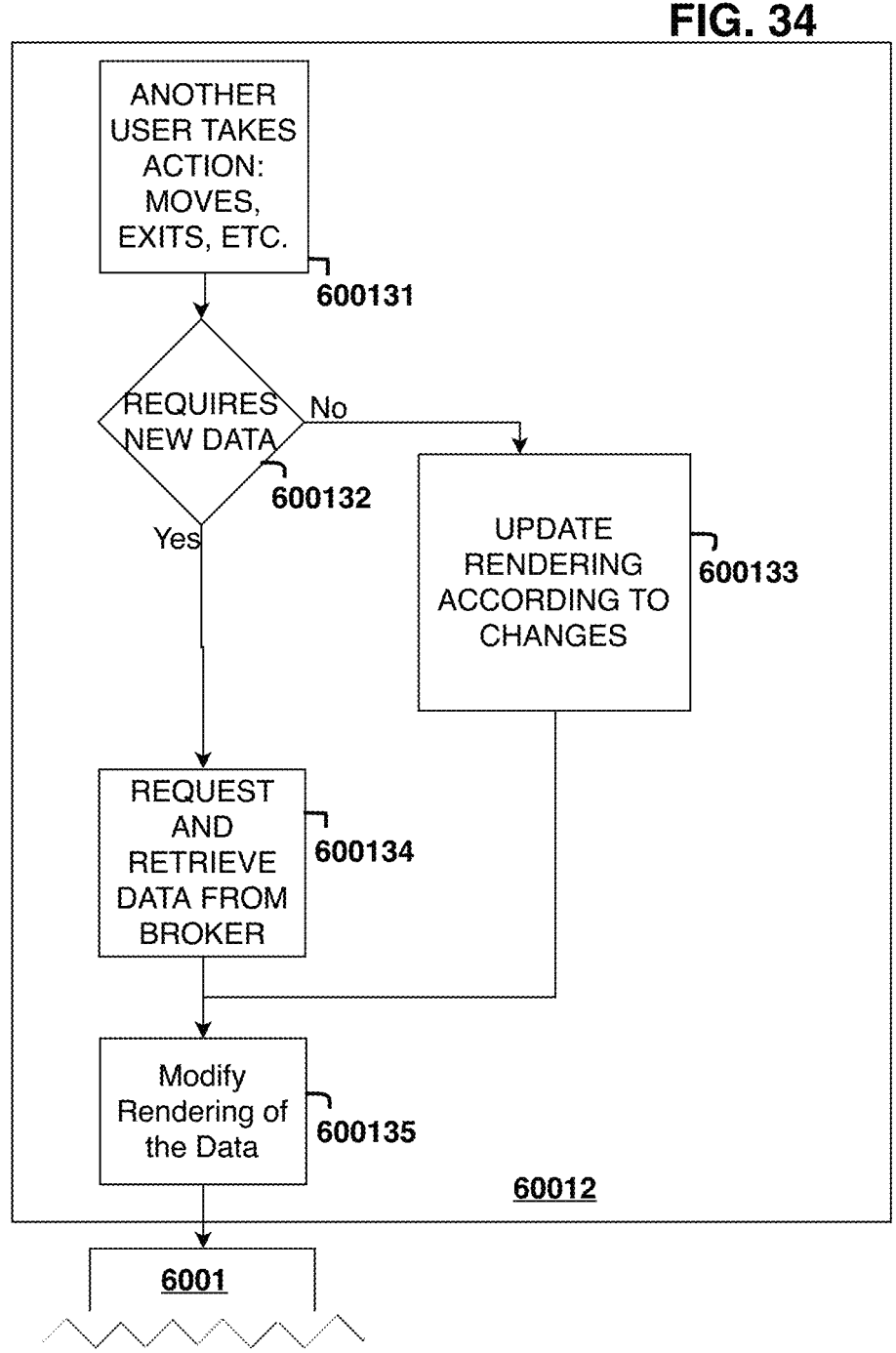

FIG. 34 shows step 60013 in more detail. As shown, at step 600131, the Program 250 detects that another user has taken an action inside the simulation, for example, such as moving their position, changing the data, or removing the data. The Program 250 is informed of the change to the simulation by the Multi-user Networking Module 106. After step 600131, the Program 250 advances to step 600132, which updates the rending according to the changes. For example, if another user changed their position in the virtual environment (i.e. moved), that user's avatar in the simulation would be updated at step 600132 to show the avatar in the new position. Or, for example, if another user moved an object, such as a vehicle or a building, the position of that object in the virtual simulation would be changed at step 600132 to the new position, for all other users currently in the same simulation. Or, for example, if another user removed data, the data would be removed at step 600132 for all users currently in the same simulation. After step 600132, the Program 250 returns to step 6001.

Figure 35:
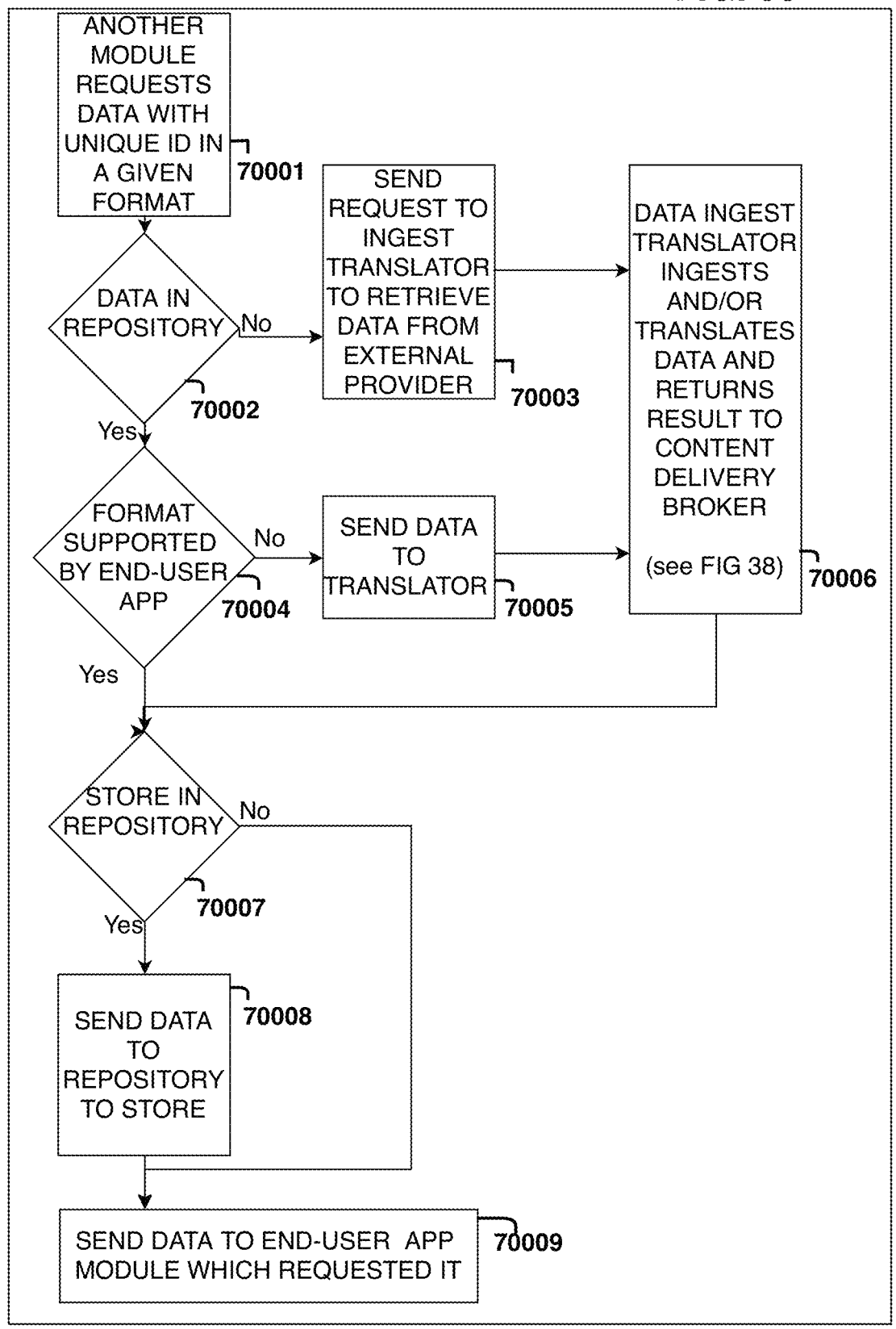
FIG. 35 is a flow chart of the Content Delivery Broker steps.

FIG. 35 shows a flow-chart of the steps performed by the Content Delivery Broker 105 when an End-user Application Module 101 requests data. Beginning with step 70001, an End-user Application Module 101 makes a request that contains at least one Unique ID. After step 7001, the Program 250 advances to step 70002, and Program 250 determines if the data file associated with each Unique ID being requested is located in the Content Repository 104 or in External Data Sources 108. It does this by sending a request with the Unique ID to the Content Repository Module 104, which searches its database and retrieves the metadata attributed with that ID, which consists of a variable that specifies the storage location for the data file. Upon determining the location of the data, at step 70002 if the Program 250 determines that the Data exists in External Data Sources 108, the program advances to step 70003 that sends the data request to the Data Ingest Translators Module 107 that retrieves the data from external data providers and translates it into a native format and returns it to the Content Delivery Broker Module 105, step 70006. Alternatively, if at step 70002 the Program 250 determines that the data file is located in the Content Repository Module 104 the Program 250 advances to step 70004, which checks whether the data file's format is supported (i.e. compatible with) by and/or optimized for the End-user Application Module 101 making the request. If not, the Program 250 advances to step 70005 which sends the incompatible data to the Data Ingest Translator Module, which translates it into a compatible format and returns the compatible data to the Content Delivery Broker Module 105, step 70006. After steps 70006 and 70004, the Program 250 advances to step 70007 in which the data may be stored in the Content Repository according to the system configuration file(s), the physical configuration and other factors. If the system 100 is configured to store translated data in the Content Repository Module 104, and the data is new, the Program 250 advances to step 70008 in which the Content Delivery Broker Module 105 sends the translated data to the Content Repository Module 104 for it to store in a database for later use. If the system 100 is configured to not store newly translated data in the content repository, it skips step 70008. After steps 70007 or 7008, the Program 250 advances to step 70009, in which the Content Delivery Broker Module 105 sends the data to the End-user Application Module 101 that has requested or otherwise needs the data.

Figure 36:
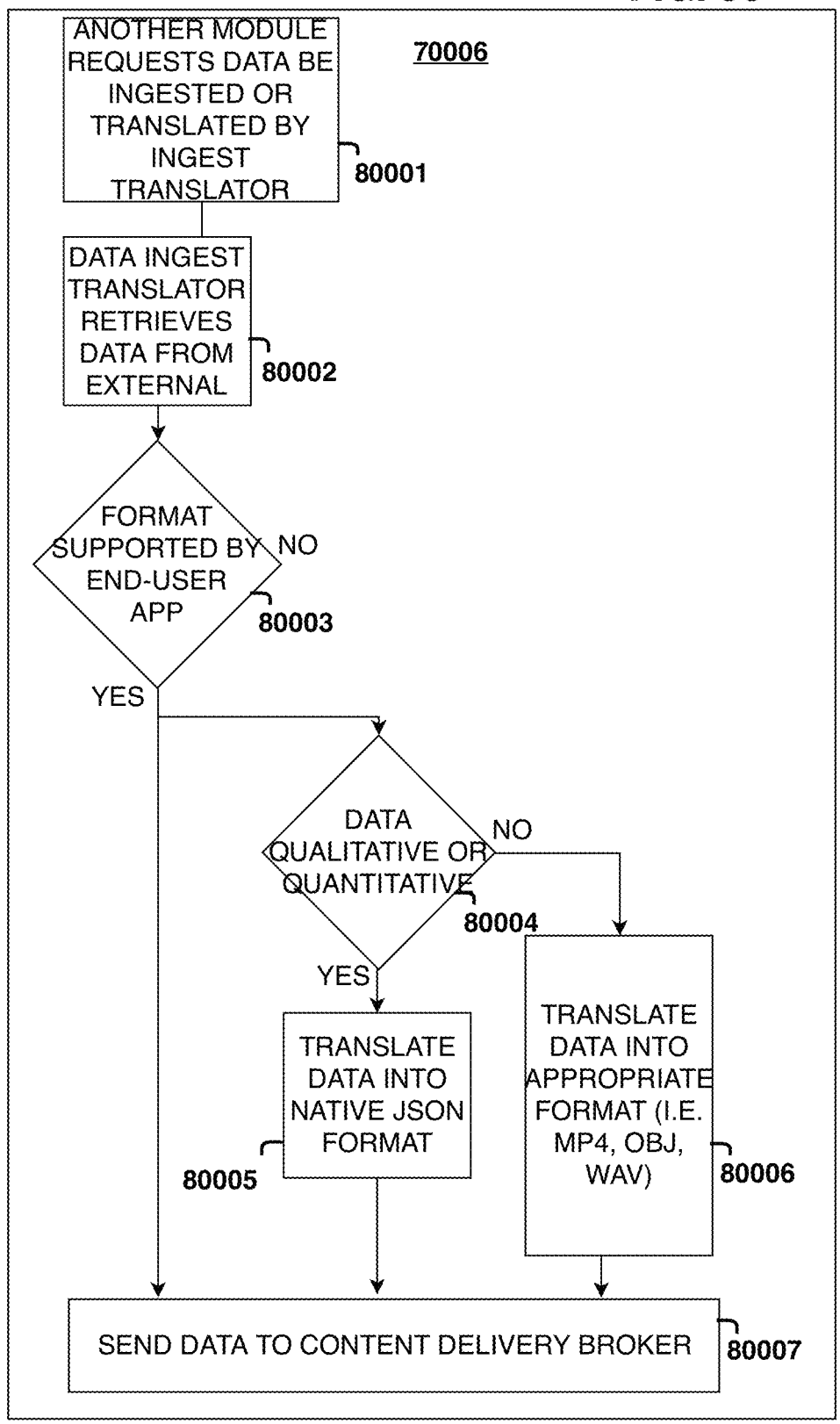
FIG. 36 is a flow chart of the Data Ingest Translator steps.

FIG. 36 shows a flow-chart of the steps performed by the Data Ingest Translators Module 107 when it receives a request to translate data, step 80001, such as a request from the Content Delivery Broker Module 105 or the Simulation Content Authoring Module 103. After receiving a request, the Program 250 advances to step 80002 which retrieves the data from an External Data Provider 108 and then the Program 250 advances to step 80003 where it checks whether the data format of the retrieved data is comparable with the requesting module. If so, Program 250 sends the data back to the Content Delivery Broker Module 105, step 80007. If not, the Program 250 checks whether the data is qualitative and/or quantitative data, and thus or otherwise able to be stored in the JSON file format, or not (such as images, videos, and 3D models). If so, the Data Ingest Translators Module 107 translates the data into JSON, step 80005. If not, the Data Ingest Translators Module 107 translates the data into a suitable format natively supported by the system 100 and the module making the request, step 80006. After steps 80005 and 80006 the Program 250 sends the data to the Content Deliver Broker step 80007.

The invention claimed is:

1. A modular interactive simulation system comprising:
   one or more client or server devices, each client or server device having one or more storage devices holding one or more computer programs for generating simulations of interactive virtual realities or mixed realties, and one or more processing units for running computer programs and for holding and processing one or more modules, wherein each module is loosely coupled to one or more other modules for operating together and operating independently of each other to provide a simulation of objects having two or three dimensions;
   one or more end user application modules, each end user application module for displaying and interacting with a simulation and adapted to request data from other modules and/or external providers wherein the one or more end user application modules generate data signals for sensor data;
   a data ingest translators module for receiving data from external providers, parsing the received data, and for translating the parsed data into formats compatible with the formats of the end user application modules;
   a machine learning module holding one or more models of machine learning for analyzing results of user data and for modifying instructions to the simulation system based upon the analysis of the results user data;
   a content repository module for holding data and instructions for simulation programs, and data for results of simulations wherein the content delivery broker applies unique identifiers to stored content;
   a multi-user networking module for synchronizing variables among end user application modules;
   a simulation content authoring module having an application programming interface for enabling an author to communicate with design software to create content for simulations, simulation programs, and for modifying a simulation program while the simulation program is running by changing the instructions of the simulation program; and
   a content delivery broker loosely connected to each of the end user application modules, the data ingest translators module, the machine learning module, the content repository module, external sources, and the simulation content authoring module, said content delivery broker adapted for receiving data requests from the modules, for searching the content repository module and external sources for data responsive to the requests and for routing responses to data requests to the modules requesting the data.

2. The modular system of claim 1 wherein two or more end user application modules have different formats for generating, rendering, displaying, sending, or receiving data.

3. The modular system of claim 1 where the end user application modules comprise one or more from the group consisting of personal computers, tablets, smartphones, augmented reality glasses or virtual reality headsets.

4. The modular system of claim 1 wherein the end user application module further comprises an input/output module.

5. The modular system of claim 4 wherein the input/output module has a peripheral mediator adapted to receive and send input and output signals for peripherals.

6. The modular system of claim 5 wherein the input signals comprise one or more signals representative of visual, auditory, and physical feedback.

7. The modular system of claim 6 wherein the input signals comprise one or more signals representative of physical activity, hand positions, head positions, head rotation, and positions of tracked objects and biological monitors, heart rate, respiration, and blood pressure.

8. The modular system of claim 5 wherein the output signals comprise one or more signals for the group consisting of audio speakers, video displays, and haptics.

9. The modular system of claim 4 wherein the end user application module further comprises a system module mediator coupled to the multi-user networking module and to the content delivery broker module.

10. The modular system of claim 1 wherein the data ingest translators module is adapted to receive data from a plurality of external data providers.

11. The modular system of claim 1 wherein the data ingest translators module is adapted to receive data from the simulation content authoring module and to translate the received data into data compatible with end user application modules.

12. The modular system of claim 11 wherein the content delivery broker module and the content repository module send and receive data between each other.

13. The modular system of claim 11 wherein the content delivery broker outputs data from the content repository module to the data ingest translators module to translate data from the content repository module that is not compatible with one or more end user application modules or end user devices.

14. The modular system of claim 1 wherein the end user application modules are coupled to the simulation content authoring module for receiving requests from the end user application modules to alter the content of a simulation.

15. The modular system of claim 14 wherein the simulation content authoring module authors new instructions for the simulation while the simulation is running.

16. The modular system of claim 1 wherein the content deliver broker applies unique identifiers to stored alterations.

17. The modular system of claim 1 further comprising a multi-user networking module coupled to the end user application modules.

18. The modular system of claim 17 wherein the multi-user networking module is adapted to couple the end user application modules together for exchanging data among end users.

19. The modular system of claim 18 wherein the data exchanged among end user application modules are unique identifiers.

20. The modular system of claim 17 wherein the multi-user networking module is coupled to the content delivery broker through each end user application module.

21. The modular system of claim 17 wherein the end user application module(s) are coupled to the multi-user networking module for exchanging information and data among end user application modules.

22. The modular system of claim 1 wherein the data ingest translators module is loosely coupled to the simulation content authoring module and loosely coupled to the machine learning module for receiving data requests and requests for machine learning models and for translating the received data and received models into formats compatible with the modules making the data requests and model requests.

23. The modular system of claim 1 wherein the simulation content authoring module is loosely coupled to each of the data ingest translators module, the machine learning module, and the content delivery broker whereby the simulation content authoring module makes data requests and exchanges data with the content delivery broker module, exchanges data with the machine learning module and outputs data to the data ingest translators module for translation into formats compatible with the end user application modules.

24. The modular system of claim 1 wherein the content repository module is loosely coupled with the content delivery broker module and loosely coupled the machine learning module and is adapted for receiving and holding data received from the content delivery broker module and the machine learning module and for sending stored data to the content delivery broker module and the machine learning module.

25. The modular system of claim 1 wherein one or more modules include one or more machine learning models for analyzing the operation of the module modifying instructions in the module based upon the analysis of the operation of the module.

26. The modular system of claim 1 wherein the machine learning module comprises a plurality of machine learning models for delivery on demand to other modules, said models are adapted to acquire test data on the operation of the modules and provide new instructions to the system based upon the results of test data analyzed by the models.

27. The modular system of claim 1 wherein the machine learning module is coupled to the content delivery broker module, the content repository module, and to the data ingest translators module(s) wherein the machine learning module comprises a plurality of machine learning models for delivery on demand to other modules, said models are adapted to acquire test data on the operation of the modules and provide new instructions to the system based upon the results of test data analyzed by the models.

28. The modular system of claim 1 wherein modules are configured to accept data in one format and the data ingest translators module translates data into the one format.

29. The modular system of claim 28 wherein the one format is a format for text data.

30. The modular system of claim 29 wherein the one format is JSON.

31. The modular system of claim 29 wherein modules configured to accept non-text data in one or more formats.

32. The modular system of 31 wherein the non-text data are one or more types of data selected from the group consisting of images, video, audio and three dimensional models.

33. The modular system of claim 32 wherein the modules are configured to accept data in a single different format for each type of data and the data ingest translators module translates the non-text type of data into the single different format accepted by the modules.

* * * * *